United States Patent [19]

Tanaka et al.

[11] Patent Number: 4,546,690

[45] Date of Patent: Oct. 15, 1985

[54] APPARATUS FOR DISPLAYING MUSICAL NOTES INDICATIVE OF PITCH AND TIME VALUE

[75] Inventors: Yoshiaki Tanaka, Fujisawa; Mamoru Inami, Yokohama; Zenju Otsuki, Kawasaki, all of Japan

[73] Assignee: Victor Company of Japan, Limited, Japan

[21] Appl. No.: 605,672

[22] Filed: Apr. 27, 1984

Related U.S. Application Data

[63] Continuation-in-part of Ser. No. 567,175, Dec. 30, 1983, Pat. No. 4,510,840.

[30] Foreign Application Priority Data

| | | | |
|---|---|---|---|
| Apr. 27, 1983 | [JP] | Japan | 58-74331 |
| Apr. 27, 1983 | [JP] | Japan | 58-74332 |
| Apr. 27, 1983 | [JP] | Japan | 58-74333 |
| Apr. 27, 1983 | [JP] | Japan | 58-74334 |

[51] Int. Cl.[4] .......... G09B 15/02; G04F 5/02

[52] U.S. Cl. .......... 84/477 R; 84/484

[58] Field of Search .......... 84/454, 462, 470 R, 84/477 R, 484, DIG. 18

[56] References Cited

U.S. PATENT DOCUMENTS

| | | | |
|---|---|---|---|
| 4,176,578 | 12/1979 | Campbell et al. | 84/462 X |
| 4,392,409 | 7/1983 | Coad, Jr. et al. | 84/477 R X |
| 4,434,697 | 3/1984 | Roses | 84/477 R X |

*Primary Examiner*—William B. Perkey

*Attorney, Agent, or Firm*—Lowe, King, Price & Becker

[57] ABSTRACT

An input audio signal is analog-to-digital (AD) converted into digital data which is processed by a central processing unit (CPU) for determining pitch of each sound by effecting Fast Fourier Transform (FET) operation and power spectrum calculation. The determination of the sound pitch is effected twice in sequence, and by using frequency and level data resulted from two consecutive determinations, the time length of the sound is detected. After the pitch and the time length are determined, data indicative of a given musical note pattern is produced so that a musical note indicative of time value is indicated at an appropriate position on a staff displayed on a screen of a display unit. Such data from the CPU is fed via a video display processor to a video RAM to be stored therein where the video display processor produces a video signal fed to the display unit in turn. In one embodiment, a note indicative of only sound pitch is displayed immediately after the pitch is determined, and the pattern of the note is changed to indicate time value if the sound is detected as a continuous sound. In another embodiment, the relationship between the time value of a note and actual time length can be manually set so that desired tempo can be selected. Furthermore, rhythm sounds corresponding to a selected tempo may be emitted, while data indicative of the selected tempo may be displayed.

20 Claims, 70 Drawing Figures

*FIG. 7*

| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|---|
| 0 | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
| 1 | 32 | 33 | 34 | 35 | 36 | 37 | 38 | | | | | | | | | | | | | | | | | | 56 | 57 | 58 | 59 | 60 | 61 | 62 | 63 |
| 2 | 64 | 65 | 66 | 67 | 68 | 69 | | | | | | | | | | | | | | | | | | | | | 90 | 91 | 92 | 93 | 94 | 95 |
| 3 | 96 | 97 | 98 | 99 | 100 | | | | | | | | | | | | | | | | | | | | | | | | | 125 | 126 | 127 |
| 4 | 128 | 129 | 130 | 131 | | | | | | | | | | | | | | | | | | | | | | | | | | | 158 | 159 |
| 5 | 160 | 161 | 162 | | | | | | | | | | | | | | | | | | | | | | | | | | | | 190 | 191 |
| 6 | 192 | 193 | | | | | | | | | | | 205 | | | | | | | | | | | | | | | | | | 222 | 223 |
| 7 | 224 | 225 | | | | | | | | | | | | | | | | | | | | | | | | | | | | | 254 | 255 |
| 8 | 256 | 257 | | | | | | | | | | | | | | | | 274 | | | | | | | | | | | | | 286 | 287 |
| 9 | 288 | 289 | | | | | | | | | | | | | | | | | | | | | | | | | | | | | 318 | 319 |
| 10 | 320 | 321 | | | | | | | | | | | | | | | | | | | | | | | | | | | | | 350 | 351 |
| 11 | 352 | 353 | | | | | | | | | | | | 366 | 367 | 368 | | | | | | | | | | | | | | | 382 | 383 |
| 12 | 384 | 385 | | | | | | | | | | | | | 399 | 400 | 401 | | | | | | | | | | | | | | 414 | 415 |
| 13 | 416 | 417 | | | | | | | | | | | | | | 432 | 433 | 434 | | | | | | | | | | | | | 446 | 447 |
| 14 | 448 | 449 | | | | | | | | | | | | | | | | | | | | | | | | | | | | | 478 | 479 |
| 15 | 480 | 481 | | | | | | | | | | | | | | | | | | | | | | | | | | | | | 510 | 511 |
| 16 | 512 | 513 | | | | | | | 521 | | | | | | | | | | | | | | | | | | | | | | 542 | 543 |
| 17 | 544 | 545 | 546 | | | | | | | | | | | | | | | | | | | | | | | | | | | | 574 | 575 |
| 18 | 576 | 577 | 578 | 579 | | | | | | | | | | | | | | | | | | 598 | | | | | | | | | 606 | 607 |
| 19 | 608 | 609 | 610 | 611 | 612 | | | | | | | 619 | | | | | | | | | | | | | | | | | | | 638 | 639 |
| 20 | 640 | 641 | 642 | 643 | 644 | 645 | | | | | | | | | | | | | | | | | | | | | | | 668 | 669 | 670 | 671 |
| 21 | 672 | 673 | 674 | 675 | 676 | 677 | 678 | 679 | | | | | | | | | | | | | | | | | | | | 699 | 700 | 701 | 702 | 703 |
| 22 | 704 | 705 | 706 | 707 | 708 | 709 | 710 | 711 | 712 | | | | | | | | | | | | | | | | | 729 | 730 | 731 | 732 | 733 | 734 | 735 |
| 23 | 736 | 737 | 738 | 739 | 740 | 741 | 742 | 743 | 744 | 745 | 746 | 747 | 748 | 749 | 750 | 751 | 752 | 753 | 754 | 755 | 756 | 757 | 758 | 759 | 760 | 761 | 762 | 763 | 764 | 765 | 766 | 767 |

FIG.16B FIG.16D FIG.16F FIG.16H
FIG.16A FIG.16C FIG.16E FIG.16G FIG.16I
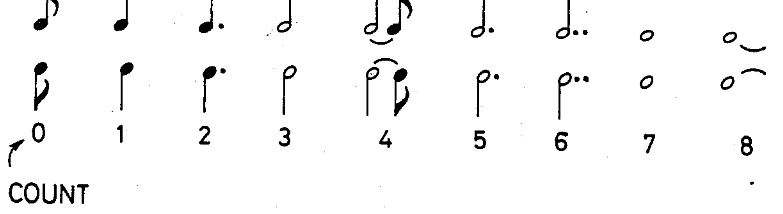
FIG. 18
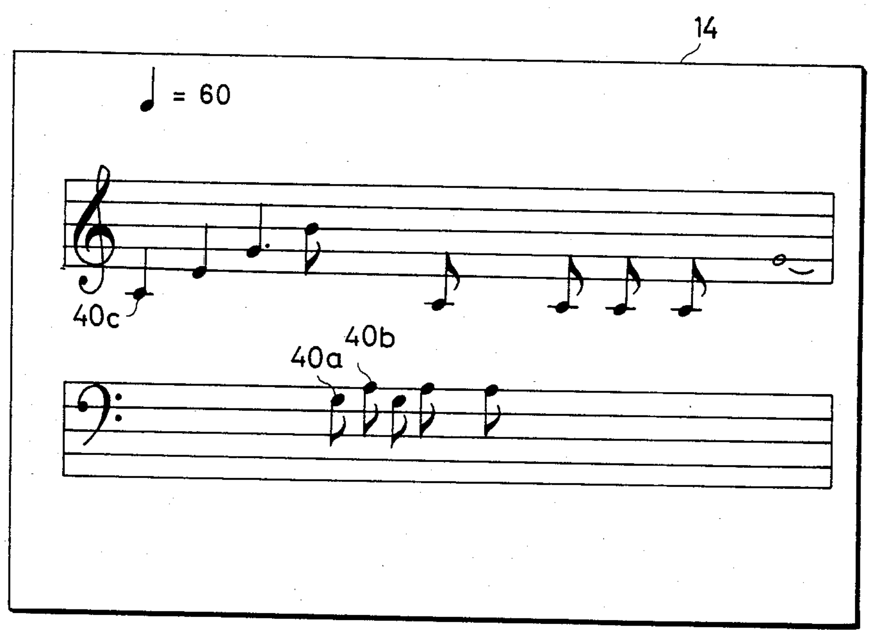

APPARATUS FOR DISPLAYING MUSICAL NOTES INDICATIVE OF PITCH AND TIME VALUE

The present application is a continuation-in-part of Ser. No. 567,175, filed Dec. 30, 1983, now U.S. Pat. No. 4,510,840.

BACKGROUND OF THE INVENTION

This invention relates generally to audio signal processing, and more particularly the present invention relates to a display device which indicates musical notes representing varying pitch of an input audio signal on a screen of a display unit where each note shows time value.

Musical note display devices, which are capable of indicating musical notes on a staff of a music sheet in accordance with input audio signals from a musical instrument, have been desired since such a device is useful for composing or writing music and for music education. Various devices have been made hitherto for indicating musical notes, and a conventional device of this sort is simply arranged to selectively energize lamps on a board on which a staff of musical sheet is indicated, in accordance with electrical signals produced by a keyboard. However, such a conventional display device cannot handle sounds emitted from musical instruments having no keyboard, such as stringed instruments or wind instruments. Therefore, in an other conventional display device, sounds from musical instruments are first converted into an electrical signal, and frequency analysis is effected by a number of band pass filters so as to determine the pitch to be displayed by way of a lamp selected from a plurality of lamps on a staff-like board or a display panel. However, such a conventional musical note display device requires a number of band pass filters, and therefore it suffers from a complex structure.

The inventors of the present invention have invented a musical note display device which is capable of displaying musical notes indicative of only sound pitch, and filed a patent application prior to the present application. The present invention is an improvement of the prior invention, and the apparatus according to the present invention is capable of displaying musical notes indicative not only of sound pitch but also of time value. In the case of sounds from a keyboard, detection or analysis of time value of each musical note to be displayed may be readily effected by measuring time length of a continuous signal produced when a given key of the keyboard is depressed. However, in the case of sounds emitted from various musical instruments or in the case of vocal sounds, determination of time value has hitherto been considered extremely difficult since the frequency and the level of such sounds varies in various manners as time passes.

SUMMARY OF THE INVENTION

The present invention has been developed in order to remove the above-described drawbacks inherent to the conventional musical note display devices.

It is, therefore, an object of the present invention to provide a new and useful musical note display device, which is capable of accurately indicating musical notes on a staff of music sheet displayed on a display unit screen without requiring a complex structure, where each note on the staff represents not only the pitch of an input audio signal but also the time length thereof.

According to a feature of the present invention an input audio signal is AD converted to obtain digital data which are used in Fast Fourier Transform (FFT) operation, and the results of FFT operation are used for power spectrum calculation, and then spectrum data obtained in this way are used to determine a fundamental tone in a particular way so that the pitch of the input audio signal is accurately detected. After the pitch is obtained, it is determined whether the sound is continuous or not. When it is determined that the sound is noncontinuous, the time value of a note representing the sound detected immediately before the detection of noncontinuousness is determined, and is indicated by way of a corresponding note, such as a quarter note, eighth note or the like. In order to indicate a note on a staff, pattern data indicative of a musical note are produced and transmitted via a video display processor to a video RAM, thereby producing a video signal for indicating a staff and musical notes at appropriate position in the displayed staff on a display unit screen.

In accordance with the present invention there is provided a musical note display device for displaying musical notes each indicative of pitch and time length of each sound of an input audio signal on a displayed staff, comprising: analog-to-digital converting means for converting said input audio signal into digital data by using sampling pulses having a sampling frequency; computing means for effecting FFT operation by using said digital data, for executing power spectrum calculation by using result of said FFT operation, for determining a pitch of each sound by using spectrum data obtained by said power spectrum calculation, for determining time value of each sound by measuring time length of each sound, and for determining a pattern to be displayed in accordance with the pitch and time value of each sound; said computing means determining the pitch by obtaining a fundamental tone by obtaining a frequency component whose level is lowest within a predetermined level range from a highest level, and whose frequency is lower than a frequency at which the level is the highest, and determining the pitch, in the case such a frequency component is not detected, by regarding the frequency component, whose level is the highest, as the fundamental tone; said computing means determining the time value by measuring time length for which each sound is regarded as continuous, where each sound is regarded as continuous when frequency difference and level difference between two consecutive detections are both within predetermined ranges, and when the level of said sound is above a predetemined level; and display means including a video display processor, a video RAM and a display unit, said video display processor being controlled by said computing means to store data indicative of said pattern into said video RAM, and said display unit being responsive to a video signal from said video display processor for indicating musical notes displayed at appropriate position on a displayed staff.

In accordance with the present invention there is also provided a method of detecting pitch and time length of a sound of an input audio signal, comprising the steps of: (a) converting said input audio signal into digital data; (b) effecting FFT operation by using said digital data; (c) executing power spectrum calculation by using result of said FFT operation; (d) obtaining a fundamental tone to determine the pitch of said sound of said input audio signal by using spectrum data obtained by said power spectrum calculation, the step of obtaining said fundamental tone having the steps of: obtaining a frequency value of a frequency component whose level is lowest within a predetermined level range from a highest level and whose frequency is lower than a frequency at which the level is highest; and obtaining a frequency value at which the level is highest in the case no frequency component is detected within said predetermined level range in the above step; (e) repeating said steps (a) to (d) again so that two frequency data of said fundamental tone, and two level data are obtained for representing the results of two consecutive detections; determining time length of said sound by using said result of two consecutive detections, the step of determining time length having the steps of: detecting whether the difference between two frequency data of said results of two consecutive detections is or is not within a predetermined frequency range; detecting whether the difference between two level data of said results of said two consecutive detections is or is not within a predetermined level range; detecting whether the level of the latter data of said results of said two consecutive detections is or is not above a predetemined value regarding said sound are a continuous sound only when all determinations in said three steps of time length determination have resulted in YES; and regarding said sound as a noncontinuous sound if one or more determinations in said three steps has resulted in NO.

BRIEF DESCRIPTION OF THE DRAWINGS

The object and features of the present invention will become more readily apparent from the following detailed description of the preferred embodiments taken in conjunction with the accompanying drawings in which:

FIG. 7 is an explanatory diagram of sections on a display unit screen of the musical note display device of FIG. 1A;

FIGS. 16A through 16I are diagrams showing various musical note patterns to be displayed in the third embodiment device;

FIG. 18 is a diagram showing an example of a music sheet displayed on a screen of the display unit of FIG. 14;

The same or corresponding elements and parts are designated at like reference numerals throughout the drawings.

DETAILED DESCRIPTION OF THE INVENTION

Figure 1A:
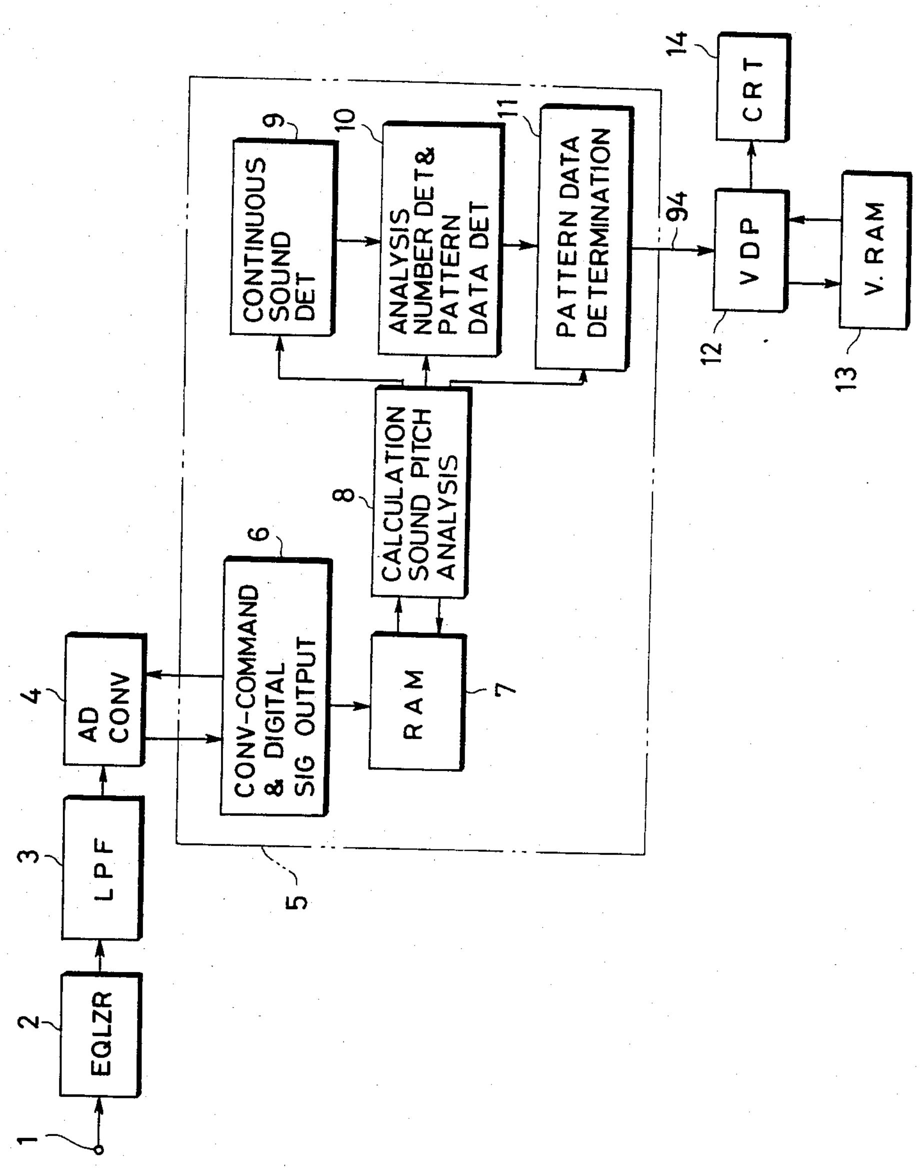
FIG. 1A is a schematic block diagram of a first embodiment of the musical note display device according to the present invention.

Referring to FIG. 1A a schematic block diagram of a first embodiment of the present invention is shown. An input audio signal applied from a sound source to an input terminal 1 is then fed to a graphic equalizer 2 in which frequency response of the input audio signal is changed so that frequency analysis will be readily made. Then an output signal from the graphic equalizer 2 is fed to an anti-aliasing filter 3 for removing unnecessary high frequency components threfrom so that aliasing noises would not occur on analog-to-digital (AD) conversion effected by an AD converter 4 to which an output signal from the anti-aliasing noise filter 3 is applied. The anti-aliasing filter 3 comprises a low pass filter for limiting the frequency range of the input audio signal so that frequency limited signal is fed to the AD converter 4. A control unit 5, which may be a microcomputer as will be described hereinlater, is responsive to digital output data from the AD converter 4 for processing the digital data representing each audio signal thereby determining the pitch as well as time value or time length of each sound. The AD converter 4 is controlled by a control signal generated by the control unit 5 where the sampling period of AD conversion is determined by the control signal.

Figure 1B:
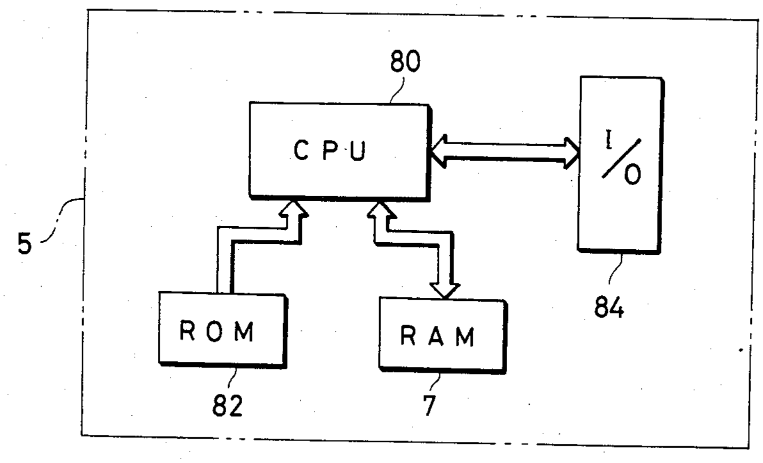
FIG. 1B is a diagram showing a microcomputer used as the control unit of FIG. 1A.

The control unit 5 may comprise a microcomputer as shown in FIG. 1B, and is shown by various blocks in FIG. 1A for the description of the function thereof. The microcomputer used as the control unit 5 of FIG. 1A comprises a central processing unit CPU 80, a read-only memory (ROM) 82, a random-access memory (RAM) 7, and an input-output device (I/O) 84 in the same manner as well known.

The circuit arrangement of FIG. 1A also comprises a video display processor (VDP) 12, a video RAM (V.RAM) 13, and a display unit 14, such as a CRT. The VDP 12 is responsive to data from the control unit 5 for temporarily storing the same in the V.RAM 13, so that various patterns are displayed by the CRT 14 for indicating one or more staffs and musical notes. In addition, as will be described in connection with other embodiments, other information such as information indicative of tempo and rhythm may also be displayed on the screen of the CRT 14.

Figure 2B:
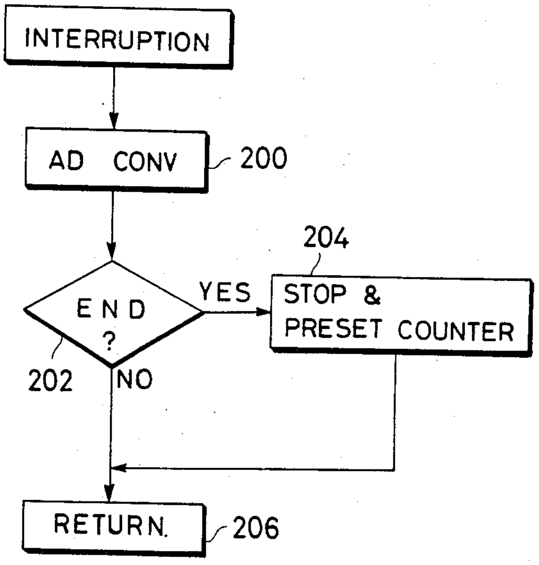
FIGS. 2A and 2B are flow charts showing the operation of the central processing unit used in the embodiment of FIG. 1A.
Figure 2A:
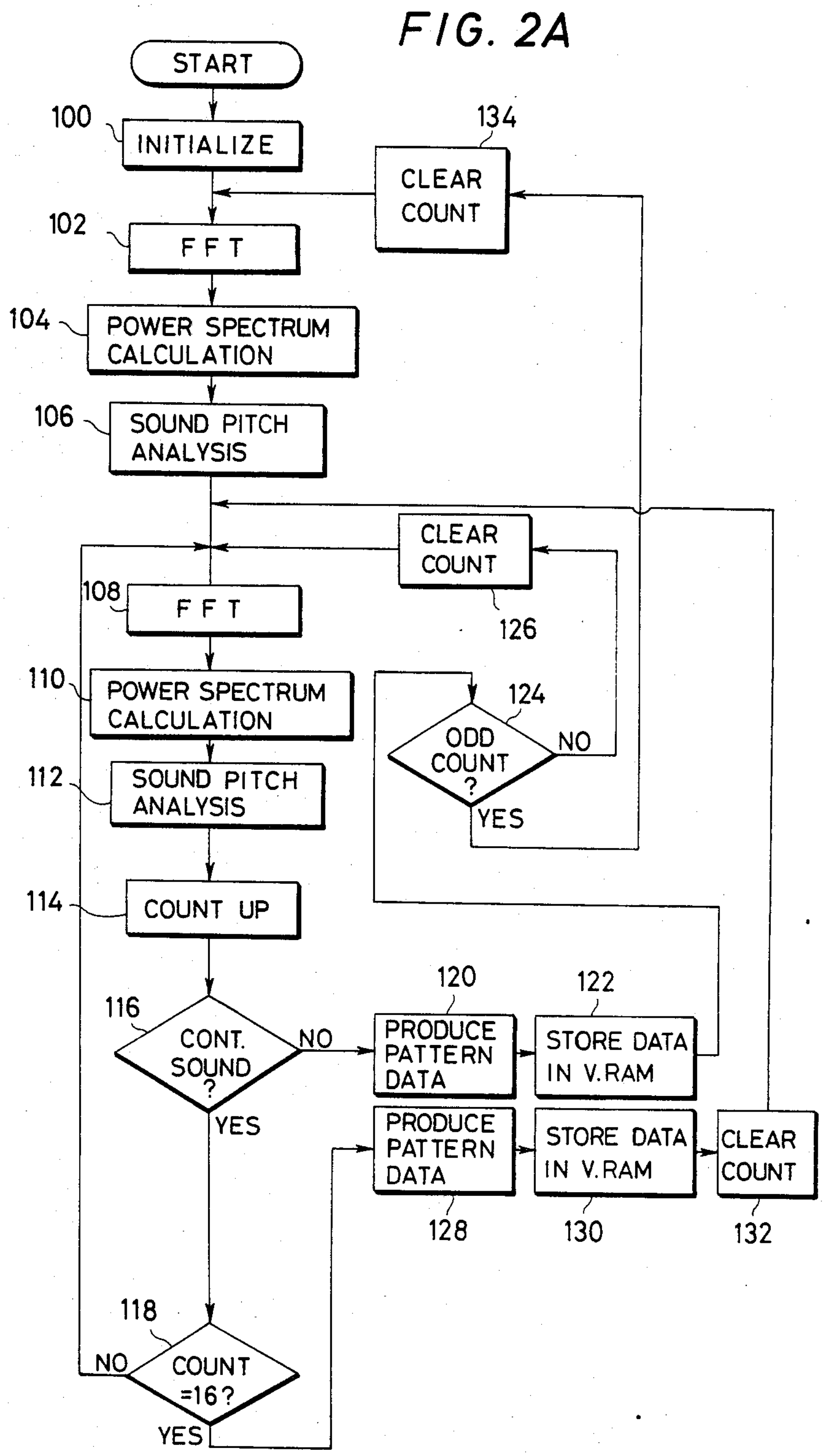

FIGS. 2A and FIG. 2B are flow charts showing the operation of the microcomputer of FIG. 1B. The flow chart of FIG. 2A shows a main routine, while the other flow chart of FIG. 2B shows an interrupt service routine. In a first step 100 of the main routine, system initialization is effected. A program interruption is arranged to occur at an interval equal to a sampling period at which sampling of the input analog signal from the anti-aliasing noise filter 3 is effected by the AD converter 4. To this end an internal counter of the microcomputer is used so that program interruption periodically occurs, and when an interruption occurs, operation of the main routine is interrupted so that the interrupt service routine of FIG. 2B is executed for effecting AD conversion. In the interrupt service routine, a conversion-commanding and digital signal outputting portion 6 of the control unit 5 produces a conversion-command signal which is fed to the AD converter 4 for causing the same to start AD conversion. The AD converter 4 starts converting the input analog signal into a digital signal in response to the conversion-command signal in a step 200 of the interrupt service routine, and a digital data word obtained from one sample is fed via the portion 6 to the RAM 7 to be stored therein. Therefore, a predetermined number of AD converted digital data words, such as 256 data words, are stored in the RAM 7 when the interrupt service routine has been executed the predetermined number of times. In a following step 202, it is determined whether the number of times of AD conversion has or has not reached the predetermined number. This is done by watching the count of another internal counter to which the predetermined number is preset. If NO, the operational flow goes to a RETURN step 206. On the other hand, if YES, the above-mentioned internal counter for indicating the number of AD converted data is stopped and presetting of the predetermined number is effected in a step 204, and then the operational flow goes to the RETURN step 206.

In this way the predetermined number of digital data words are stored in the RAM 7, and these digital data words are processed to determine the pitch by way of a calculation and sound pitch analyzing portion 8 of the control unit 5. In detail, the digital data words are used for effecting Fast Fourier Transform (FFT) operation in a step 102 of the main routine. The result of FFT operation is stored in the RAM 7, and then power spectrum calculation is effected in a step 104 so that the result thereof is also stored in the RAM 7. Then a maximum spectrum value is obtained, and then a frequency at which the maximum spectrum value is shown within the spectrum is obtained. However, this frequency cannot be simply determined as representing the fundamental tone. Therefore, the fundamental tone is determined by obtaining a frequency component whose level is lowest within a predetermined level from a highest level, i.e. the maximum spectrum value, and whose frequency is lower than the frequency at which the level is the highest. If such a frequency does not exist, the frequency component, whose level is the highest, is regarded as the fundamental tone. In this way the pitch of the input sound is determined and data indicative of the sound pitch or tone is stored in the RAM 7. The above-described determination of a sound pitch is executed in a step 106.

The above-described technique for determining sound pitch was invented by the present inventors prior to the present invention, and was described in the prior application as previously described. Since the pitch of the present invention relates to determination and display of time length of each sound rather than determination and display of each sound, the following description will be made in this connection mainly.

Figures 3A, 3B, 3C, 3D, 3E, 3F, 3G, 3H, 3I:
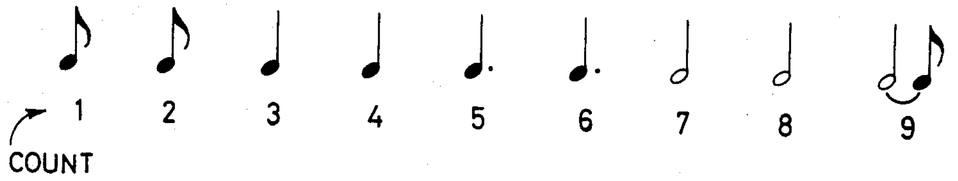
FIGS. 3A to 3P are diagrams showing various musical note patterns to be displayed in the first embodiment device.
Figures 3J, 3K, 3L, 3M, 3N, 3O, 3P:
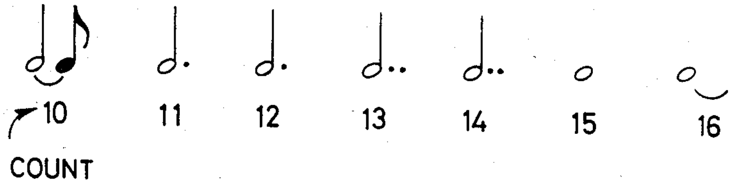
Figure 5:
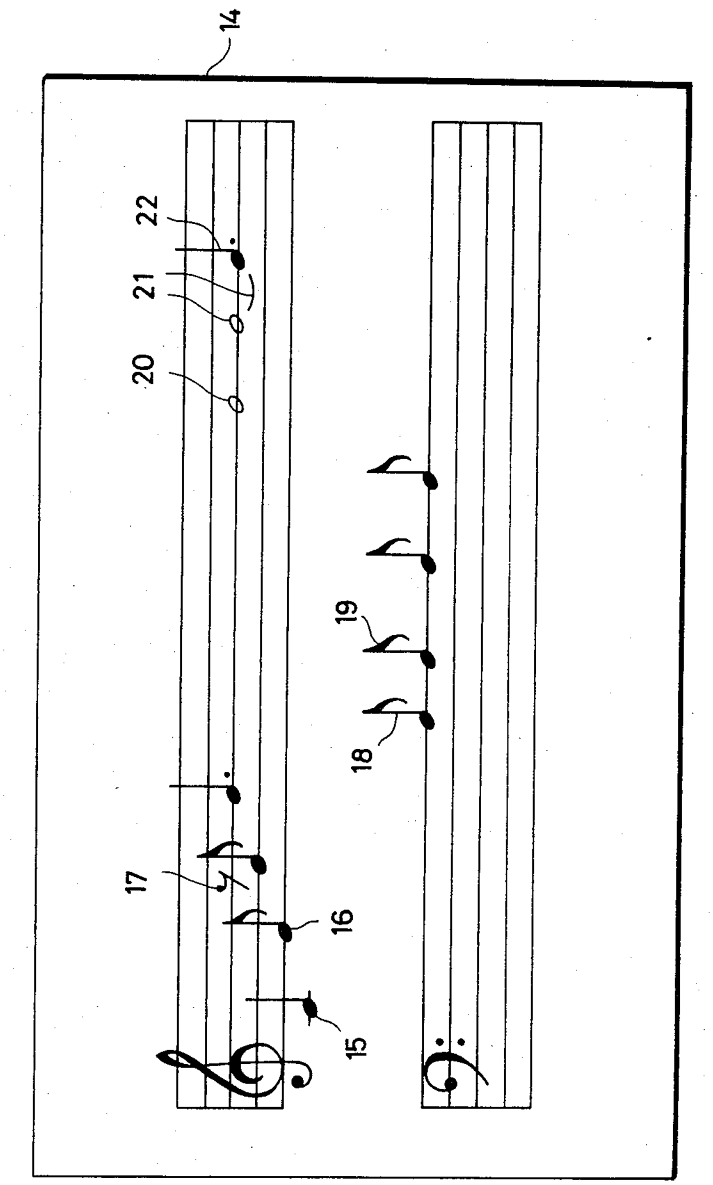
FIG. 5 is a diagram showing an example of a music sheet displayed on a screen of the display unit of FIG. 1A.

FIGS. 3A to 3P show various musical note patterns which will be displayed on a staff also displayed on the screen of the CRT 14 as shown in FIG. 5. A time length required for the execution of the steps 102, 104 and 106 of FIG. 2A is set to be one half a time period corresponding to an eighth note (quaver) shown in FIG. 3A.

Figure 4:
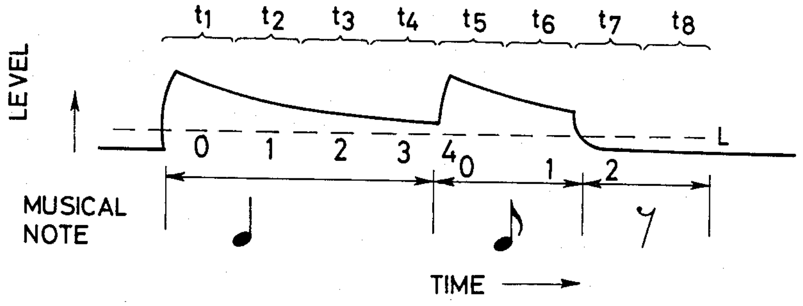
FIG. 4 is an explanatory diagram showing level of an input audio signal whose pitch and time length are to be indicated by way of the musical note patterns of FIGS. 3A to 3I.

FIG. 4 shows an example of a level variation of an input audio signal with respect to time. In FIG. 4, it is assumed that a sound having a time value equal to a quarter note is first received, and then another sound having a time value equal to an eighth note is received. The references t1, t2 . . . t8 are for indicating time length corresponding to one half the eighth note. Since the steps 102 to 106 are executed within a period of time equal to one half the eighth note, the sound pitch of the first sound is analyzed within a time period t1.

Let us assume that music sounds, each of which attenuates as time passes like the sound from the piano, are received as shown in FIG. 5. When a first sound of pitch name C and having a time value of quarter note is received, after the sound pitch analysis by the steps 102 to 106, other steps 108, 110 and 112, which are substantially the same as the steps 102, 104 and 106, are executed immediately thereafter. Thus, these steps 108 to 112 are executed within a time interval indicated at t2 in FIG. 4. Then the number of times of the sound pitch analysis by the step 112 is counted. To this end a step 114 is executed in which a count of a counter, which may be actualized by the software of the microcomputer, is increased by one. Then in a next step 116, it is determined whether the sound is a continous sound or not. This is performed by a continuous sound detecting portion 9 of the control unit 5. In order to determine whether the sound is continuous or not, comparison between two consecutive results of sound pitch analysis is performed. In this comparison, it is determined whether the sound pitch of a previous result equals that of a subsequent result, and whether the difference between the levels obtained from these two consecutive analyses is within a predetermined level range. Furthermore, it is detected whether the level of the sound just analyzed is or is not above a predetermined threshold L (see FIG. 4). In the above, in order to check whether the sound pitch just detected equals the former sound pitch, the frequency of the fundamental tone is checked such that the frequency difference between two consecutive analyses is within a predetermined frequency range. Furthermore, the level of the input sound is detected by obtaining a sum of levels at respective frequencies within the detected spectrum, which have been obtained by the above-mentioned power spectrum operation.

In the illustrated embodiment, a shortest musical note to be displayed is a quarter note, and frequency or pitch analysis is effected within a time period equal to one half the time value of the shortest musical note so that sound pitch analysis is effected at an interval corresponding to one half the shortest note. Therefore, even if a continuous input sound slightly varies in connection with its frequency or level as time passes, it can be determined if the variation is within a predetermined frequency range or predetermined level range so that the continuousness and sound pitch of the input sound can be accurately detected.

Assuming that a continuous sound having a time length equal to a quarter note is received as shown in FIG. 4, this sound is detected as a continuous sound by the continuous sound detecting portion 9, and then an analysis number detection and pattern data detection portion 10 determines whether the count has reached 16, which is or is not a maximum count, (see step 118 of FIG. 2A). When the time t2 has elapsed, since the count is only 1, the step 108 is again executed for performing FFT operation. Then steps 110 and 112 are executed to determine the pitch, and then the count is increased by one in the step 114.

The above operations of the steps 108 to 114 are repeatedly executed as long as the sound is determined as a continuous sound by the step 116. When time t4 has elapsed, where the count is now 3, let us assume a subsequent sound of pitch name E, whose time length equals that of an eighth note as shown in FIG. 5, is inputted. Then the steps 108 to 112 are executed to determine the sound pitch, and then the count of the counter is increased by one to be 4.

In a following step 116, the sound is detected as a noncontinuous sound since the sound pitch and the level thereof differ from those of the previous sound, i.e. the sound of pitch name C of a quarter note. As a result, the determination in the step 116 becomes NO, and then musical note pattern data is produced in a step 120. This is effected by the analysis number detection and pattern data detection portion 10 of the control unit 5, and pattern data designating instruction is derived therefrom to be supplied to a pattern data determining portion 11. This operation is actually done by designating a selected address of the ROM 82 of the microcomputer for reading out a predetermined pattern data.

FIGS. 3A to 3P respectively show the relationship between the count and the sort of musical notes whose pattern data are prestored in the ROM 82. In detail, data indicative of various musical notes including from eighth note to whole note are stored in correspondence with the count whose value is from 1 to 16. In the above example, since the count is 4, pattern data corresponding to a quarter note is selected (see FIG. 3D). Furthermore, since the pitch of the sound has been determined as pitch name C, the pattern data is selected so that a head of the note indicates pitch name C in the staff as shown in FIG. 5. The pattern data from the pattern data determining portion 11 is fed via the VDP 12 to the V.RAM 13 so as to be written in a predetermined table thereof. A horizontal position of a note to be displayed is determined by a count of a counter, which may be actualized by the program of the microcomputer, so that sequential notes are displayed at predetermined horizontal positions at an interval or space between two consecutive notes. In the illustrated embodiment, the number of musical notes to be displayed equals 26, and therefore, after the staff is filled with 26 notes, all the notes previously shown may be cleared to provide an empty staff so that following notes can be continuously displayed from the left end of the staff. If it is desired, however, the twenty-seventh note may be displayed at the right end with the 26 notes being shifted to the left such that the oldest note at the left end is cancelled each time a new note is added to the right end.

The VDP 12 functions as an interface between the V.RAM 13 connected thereto via a data bus 94, and the CPU 80, and is constructed such that it is capable of determining the contents of pictures to be displayed by using various data stored in the above-mentioned V.RAM 13, and of generating a composite video signal of a predetermined standard system. As this VDP 12, for instance, may be used a video display processor of Texas Instruments, Inc., of the United States, introduced in ELECTRONICS, Nov. 20, 1980 (pages 123–126) or an integral composite video generator disclosed in U.S. Pat. No. 4,262,302 issued to Texas Instruments and known as TI's TMS9918, and it is assumed that the above-mentioned video display processor is used in the following description.

In FIG. 1B, although no address-decoder is shown, in actual structure an address-decoder responsive to address data from the CPU 80 is provided so as to respectively designate the addresses of the RAM 7 and ROM 82. The CPU 80 is preferably of high-speed and capable of commanding signed multiplication, which is a basic calculation for FFT. As the CPU 80 may be used an integrated circuit TMS9995 manufactured by Texas Instruments.

Figure 6:
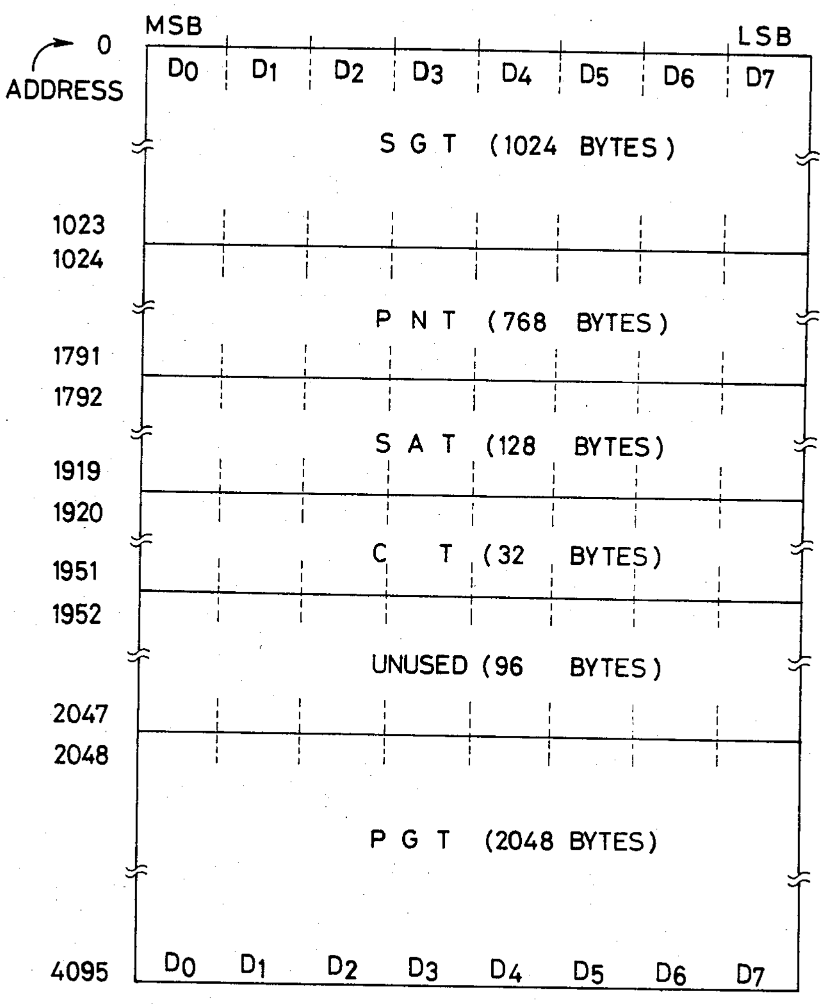
FIG. 6 is an example of a memory map of a video RAM used in the device according to the present invention.

FIG. 6 is a drawing showing an example of a memory map of the V.RAM 13 connected via the bus 94 to the VDP 12. In the memory map of the V.RAM 13 of FIG. 6, 1024 bytes from address 0 to address 1023 are used as a sprite generator table (SPG); 768 bytes from address 1024 to address 1791 being used as a pattern name table (PNT); 128 bytes from address 1792 to address 1919 being used as a sprite attribute table (SAT); 32 bytes from address 1920 to address 1951 being used as a color table (CT); and 96 bytes from address 1952 to address 2047 being unused yet; and 2048 bytes from address 2048 to address 4095 being used as a pattern generator table (PGT).

The pattern generator table PGT is capable of storing a specific pattern of 8 pixels by 8 pixels by using 8 bytes respectively for instance, and therefore 256 patterns of 8 by 8 pixels can be stored. The pattern information stored in the pattern generator table PGT is transmitted from the ROM 82 at an initial state of the device by the operation of the CPU 80. However, the pattern generator table PGT may of course be a read-only memory.

In the storing region including 8-byte portions of the pattern generator table PGT specific patterns of 8 by 8 pixels are respectively stored, and respective specific patterns can be designated by pattern names assigned to respective storing regions in which the specific patterns are respectively stored. In the case of the pattern generator table PGT of FIG. 6, 256 patterns can be designated by way of 256 pattern names from pattern name #0 through pattern name 255.

Nextly, the pattern name table PNT comprises a storing capacity corresponding to a total number of displaying sections imagined on the screen of the display unit CRT so as to store information indicating which section is of which pattern name of the pattern generator table PGT.

In an example of FIG. 7, the total number of sections set in the display unit screen is [32 columns×24 rows]=768, and since 1 byte is used as the amount of informtion for indicating 1 section, the pattern name table PNT has a storing capacity of 768 bytes as mentioned in the above.

In the case that a necessary number of patterns are stored in the pattern generator table PGT of the V.RAM 13, and that necessary pattern names assigned in correspondence with respective patterns are stored in the respective sections of the display unit screen of the pattern name table PNT, the VDP 12 produces a composite video signal complying with a specific standard system where the contents of the picture are determined by information stored in the pattern name table PNT of the V.RAM 13, information stored in the pattern generator table PGT, and information stored in the color table CT when necessary, and the produced composite video signal being fed to the CRT 14 for displaying a specific pattern on the screen of the CRT 14.

The above description is related to a case of displaying under a display mode in which a specific one of patterns stored in the pattern generator table PGT is displayed at a specific section among 768 sections, namely, so called graphic mode. When displaying a pattern with such a graphic mode, the position of the pattern is designated by the pattern name table PNT, and therefore, when it is intended to move a pattern on the display unit screen, the pitch of pattern movement on the display unit screen is 1 section (distance of 8 pixels).

In order to cause the pattern to move smoothly with the pitch of pattern movement on the display unit screen being made small, the pattern stored in the sprite generator table SGT is moved on the display unit screen at a pitch of 1 pixel with a change in co-ordinates.

The pattern to be stored in the sprite generator table SGT is sprite data which may be of either 8 pixels by 8 pixels or 16 pixels by 16 pixels. Respective patterns stored in the sprite generator table SGT are given sprite names separately as #0, #1 . . . #N, a sprite surface corresponding to a pattern with respective sprite names are arranged so that smaller numerical values indicated by the sprite names have higher priority.

In the memory map of the V.RAM 13 shown in FIG. 6, since 1024 bytes from address 0 to address 1023 are used as the sprite generator table SGT as described in the above, 128 patterns (sprite name #0 through #127) can be stored in the case of 8 pixels by 8 pixels in this case, and also 32 patterns (sprite name #0 through #31) can be stored in the case of 16 pixels by 16 pixels. In the case that 2048 bytes are assigned to the sprite generator table SGT of the V.RAM 13, it is a matter of course that the number of patterns which can be stored in the sprite generator table SGT is twice as much as the above example.

Since sprite position (1 byte for designating each of vertical position and horizontal position), name of display sprite (1 byte), color code and display sprite termination code (1 byte) and the like are set in the sprite attribute table SAT by using 4 bytes for each one sprite, in the case that 128 bytes are used as the sprite attribute table SAT, information of 32 sprites is stored in the sprite attribute table SAT.

The position of a sprite is determined with a vertical position (a numerical value indicating the vertical order of picture point) and a horizontal position (a numerical value indicating the horizontal order of pictue point) being written in the sprite attribute table SAT, where a co-ordinate of 49,152 picture points determined by 256 picture points (8 pixels by 32 sections) of horizontal direction (X direction) and 192 picture points (8 pixels by 24 sections) of vertical direction (Y direction) is provided wherein an origin of the sprite is set to the left top end, and the movement of the sprite is effected with a pitch of 1 pixel.

In the musical note display device for audio signals according to the present invention, musical notes of an audio signal are displayed on the screen of the CRT 14 by way of a staff, for instance as shown in FIG. 5 by an arrangement such that the selection of a pattern to be displayed on the screen of the CRT 14 and the designation of the way of movement of the pattern are effected by data written in the pattern name table PNT and the sprite attribute table SAT with a plurality of patterns being prestored in the pattern generator table PGT and the sprite generator table SGT.

In FIG. 5 showing an example of a displaying state on the screen of the CRT 14, various display patterns, such as staffs, treble clef, and bass clef are all prepared with the data being prestored in the ROM 82. At the beginning of the operation of the musical note display device of FIG. 1A, the above-mentioned various patterns stored in the ROM 82 are transferred to and stored in the pattern generator table PGT of the V.RAM 13 via the CPU 80 and the VDP 12, so as to be used for indication at the screen of the CRT 14. Namely, at the beginning of the operation of the display device, only the staff with a treble clef and a bass clef is displayed, and then musical notes are respectively displayed in sequence on the staff from the left end toward the right end thereof in response to respective input sounds. In detail, musical notes are displayed in sequence following the pitch change of the input audio signal each time it is determined that the input sound is noncontinuous. This point will be described in detail hereinlater.

The central porcessing unit CPU 80 produces data necessary for displaying musical note patterns indicative of respective sounds of an audio signal by executing steps in flow charts of FIGS. 2A and 2B, and the data is fed to the VDP 12 and to the V.RAM 13 to cause the CRT 14 to display the musical notes as shown in FIG. 5.

After the first musical note indicated at a numeral 15 is displayed on the staff by the execution of a step 122 of FIG. 2A, a step 124 is executed to determine whether the count is of either an odd number or an even number. In the above-described case, since the count is 4, the determination results in NO to execute a step 126 in which the count is cleared. Namely, the count at time t5 equals zero. As time passes to t6 in FIG. 4, sound pitch analysis is effected by the steps 108 to 112 in the same manner as described in the above, and then the count is set to 1 in the step 114. Then the input sound is determined as a continuous sound in the step 116, and it is determined that the count has not yet reached 16 in the step 118. As a result, the step 108 is again executed.

When an eighth rest comes at time t7 and t8, it is determined that the sound is noncontinuous since the level of the input sound is below the threshold L. Therefore, a next pattern data is produced by using the count, which is 1, and the result of sound pitch analysis at time t6. Therefore a second musical note 16 is displayed on the staff. In this way when a subsequent eighth note sound is received, an eighth rest symbol or pattern 17 is displayed.

Assuming that several sounds of pitch name A each having a time length of an eighth note are continuously but independently inputted, such sounds are determined as noncontinuous sounds each time a subsequent sound is received since the sound level difference between two consecutive time periods, such as time t2 and time t3 or time t4 and time t5, is greater than a predetermined level difference value. Therefore, the count detected each time equals 2, while the sound pitch is determined as the pitch name of A. With such information, therefore, musical note patterns 18, 19 . . . are displayed in the same manner as described in the above on the staff as shown in FIG. 5.

If a sound of a whole note emitted from a rubbed string instrument is received at time t1, the count of the counter increases to 15 as time goes from time t1 to time t15 in the step 114. During this time period from time t1 to time t15, it is determined periodically by the step 116 that the sound is continuous. As time passes to time t17, it is determined, that the sound is noncontinuous. By using the count, i.e. 15, and the sound pitch, which has already been determined, a pattern of a whole note 20 is displayed by selecting the whole note pattern of FIG. 30.

After this, when a sound corresponding to a whole note and a dotted quarter note which are coupled with each other by a tie, is inputted from time t1, the count reaches 16 at time t17, and the sound is determined as a continuous sound by the step 116. Therefore, it is detected by the step 118 that the count has reached 16, and a step 128 is executed for generating pattern data by using the count and the sound pitch in the same manner as in the step 120. In this embodiment, the pattern data of FIG. 3P is selected. Subsequently, a step 130 is executed to display a note pattern 21 on the CRT 14 in accordance with generated pattern data in the same manner as in the step 122. Then the count is cleared in a step 132, and the operational flow goes to the step 108 for FFT operation for a subsequent sound. After this, operations similar to the above are executed so that a note pattern 22 is displayed.

On the other hand, after a sound of a quarter note is inputted from time t1, if the sound is interrupted at time t4 as playing with a staccato, the count at this time is 3, and then it is determined that the sound is noncontinuous in the step 116. Therefore, a pattern of a quarter note is displayed at time t4, and it is determined that the count is of an odd number in the step 124. As a result, the count is cleared in a step 134, and the operational flow goes to the step 102 for analyzing a sound which will be received at time t5.

From the above it will be understood that one of a plurality of note patterns is selected in accordance with the count of the counter, which is indicative of the number of a time length of a continuous sound.

Figure 8A:
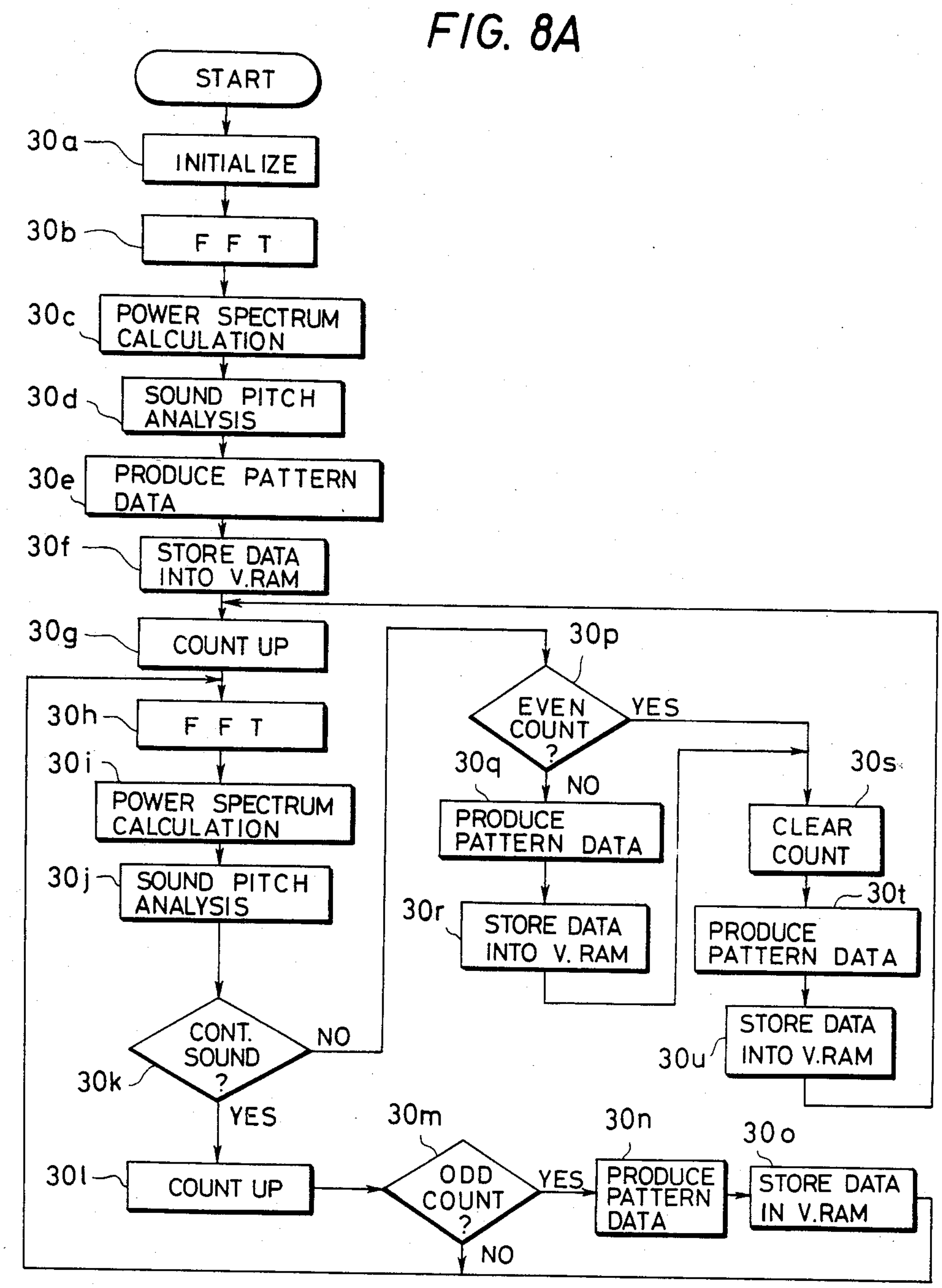
FIGS. 8A and 8B are flow charts showing the operation of the central processing unit used in a second embodiment of the invention.
Figure 8B:
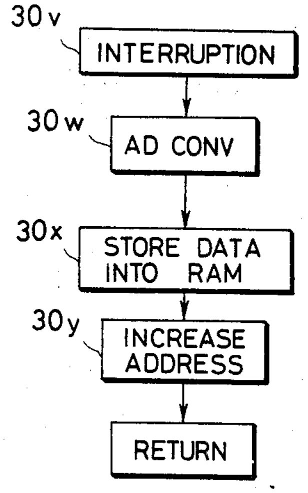
Figure 9:
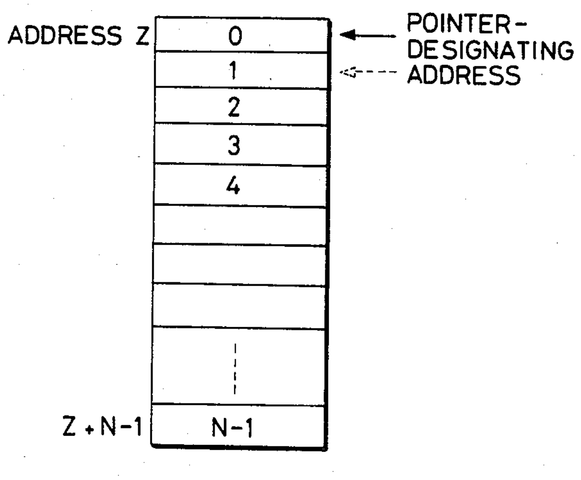
FIG. 9 is a diagram showing the addresses of the RAM used in the device according to the present invention.

Referring to FIGS. 8A and 8B another embodiment of the present invention is shown by way of flow charts of a main routine (FIG. 8A) and an interrupt service routine (FIG. 8B). The same circuit arrangement as that of FIGS. 1A and 1B may also be used for this embodiment. More specifically, the CPU 80 is arranged to execute the interrupt service routine of FIG. 8B each time interruption occurs where each interruption is arranged to occur at an interval of the sampling period of the AD converter 4. When an interruption occurs, the execution of the main routine of FIG. 8A is interrupted to execute the interrupt service routine from a starting step 30*v*, and then AD conversion is effected in a step 30*w*. AD converted digital data is then stored in the RAM 7 in a following step 30*x* such that each data is stored in each AD converted data area accompanied by an address as shown in FIG. 9. The address of the RAM 7 is designated by a pointer, which may be actualized by a predetermined storing area of the RAM 7. After each data indicative of AD converted data is stored in the RAM 7 in the step 30*x*, an address designated by the pointer is increased by one in a step 30*y* unless the address reaches a predetermined maximum number. On the other hand, if the address has reached the maximum number, then the address is reset to zero. After the completion of the step 30*y*, the interrupt service routine is terminated so that the execution of the main routine is started again.

After a predetermined number of digital data is stored in the RAM 7 in this way, FFT operation is effected by a step 30*b* of the main routine, and the result of FFT operation is stored in the RAM 7. Then power spectrum calculation is effected in a step 30*c*, and the result thereof is stored in the RAM 7. In a following step 30*d*, sound pitch analysis is effected by using data stored in the RAM 7. These operations from the step 30*b* to 30*d* are substantially the same as those in the previous embodiment and further description thereof is omitted.

Figures 10A, 10B, 10C, 10D, 10E, 10F, 10G, 10H, 10I, 10J:
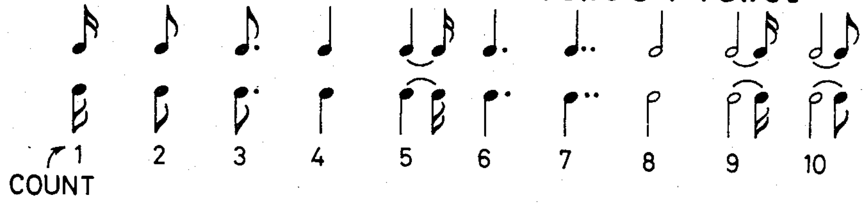
FIGS. 10A through 10R are diagrams showing various musical note patterns to be displayed by the second embodiment device.
Figure 11:
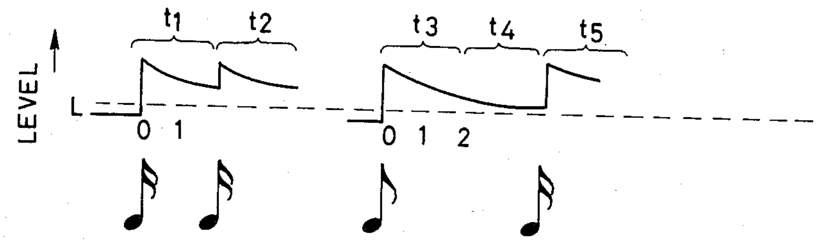
FIG. 11 is an explanatory diagram showing level of an input audio signal whose pitch and time length are to be indicated by way of the musical note patterns of FIGS. 10A to 10R.

A time length required for executing these steps 30*b* to 30*d* is selected in advance to be equal to a time value of a sixteenth note shown in FIG. 10A. Therefore, when an input sound is received as shown in FIG. 11, which shows input sound level with respect to time, the pitch of the sound at time t1 is analyzed by the steps 30*b* to 30*d*. Let us assume that a sound which attenuates as time passes, like the sound from the piano, is inputted such that a sixteenth note sound of pitch name G and a sixteenth note sound of pitch name A are alternately received as indicated by the references 45 and 46 in FIG. 12. In response to such sounds, steps 30*b* to 30*d* are executed within the time t1 of FIG. 11 so as to determine the sound pitch. Once the sound pitch is determined, a note pattern is selected in a step 30*e* by using the pitch and a count of a counter which is used in a similar manner to the previous embodiment. However, since it is impossible to finally determine the time value of the input sound until a subsequent sound or rest is detected at time t2, the pattern of the musical note to be displayed will be determined in the following manner in this embodiment.

Figures 10K, 10L, 10M, 10N, 10O, 10P, 10Q, 10R:
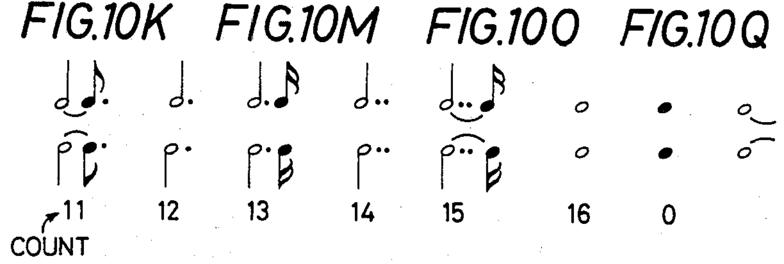

FIGS. 10A to 10R respectively show various musical notes having different time values. Musical notes of FIGS. 10A to 10O include a head (black head or white head) and a stem (tail) where some of these musical notes also have hooks or flags. On the other hand, musical notes of FIGS. 10P to 10R have only heads, and therefore these notes indicate only sound pitch but not time value. These musical notes from FIGS. 10A to 10Q respectively correspond to the count of the counter. Therefore, once the count is determined, one of the notes from FIGS. 10A to 10Q is selected. In the above example, since the count is 0, and since the sound pitch is of pitch name G, pattern data corresponding to a half note (FIG. 10Q) and to the pitch name G is derived from the ROM 82 and this pattern data is then fed via the VDP 12 to a predetermined table of the V.RAM 13.

By using the pattern data, a musical note is displayed in a step 30*f* in the same manner as in the previous embodiment. After the execution of the step 30*f*, namely, after the black head of FIG. 10Q is displayed as indicated by a reference 45 in FIG. 12, the count of the counter is increased by one in a step 30*g* so that the count becomes 1. Then steps 30*h* to 30*j*, which are substantially the same as the steps 30*b* to 30*d*, are executed for determining the pitch of a subsequent sound at time t2 of FIG. 11. After the execution of the step 30*j*, a step 30*k* is executed to determine whether the input sound is continuous or not. In detail, the sound pitch at time t1 is compared with the sound pitch at time t2, and also the difference in levels at time t1 and time t2 is detected to see whether the difference is within a predetermined level range. Furthermore, the level at time t2 is checked if it is above a predetermined threshold L shown in FIG. 11. The threshold may be set to an appropriate value considering the dynamic range of the AD converter 4 so that noises are not erroneously detected as a part of a sound of music. In this way, it is determined whether the input sound is continuous or not in the same manner as in the previous embodiment. In the above example case, the sound at time t2 is determined as a noncontinuous sound since both the pitch and the level clearly differ from those at time t1.

Figure 12:
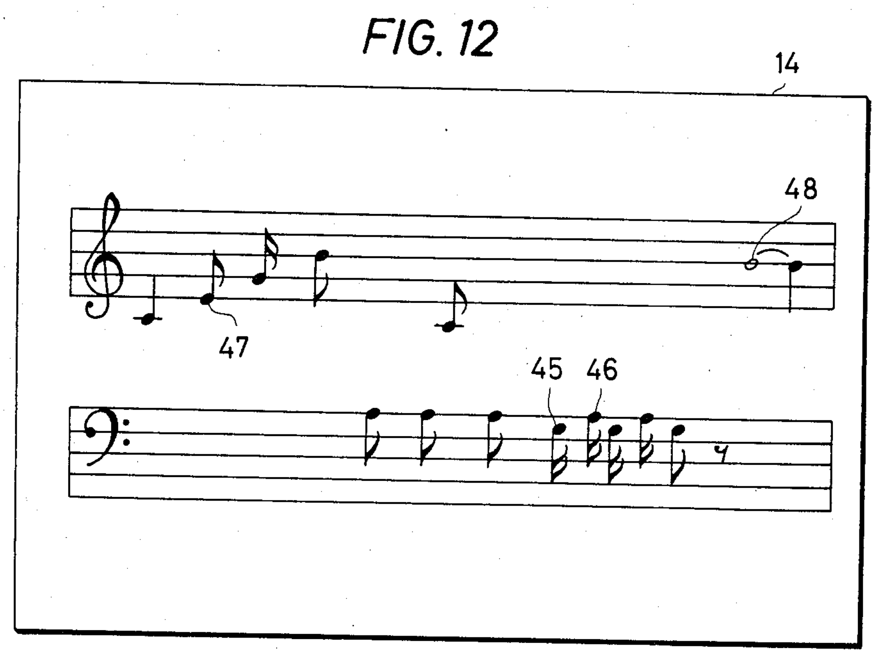
FIG. 12 is a diagram showing an example of a music sheet displayed on a screen of the display unit of the second embodiment device.

After the sound is determined as a noncontinuous sound in the step 30*k*, a step 30*p* is executed for determining whether the count of the counter is of an even number or not. Since the count is 1 at this time, a step 30*q* is executed in which a note pattern is selected by selecting a sixteenth note of FIG. 10A by using the count. Then a step 30*r* is executed to display the sixteenth note at the position where the black head 45 has been displayed. As a result, displayed pattern is seen as if a stem and a flag which represent a sixteenth note were added to the black head 45 as shown in FIG. 12.

Then the count is cleared in a step 30*s* to be equal to 0. After this, steps 30*t* and 30*u* are executed in sequence for displaying a note for the sound at time t2. In detail, a pattern data of FIG. 10Q, i.e. a black head, corresponding to the pitch name A is selected so as to display the same at a position next to the previous note 45 as indicated by a reference 46 in FIG. 12. In the step 30*t*, therefore, the count of the counter indicative of horizotal position in the staff is increased by one so that the black head 46 is displayed at a position next to the previous note 45. At this time only the black head 46 is displayed in the same manner as described in the above, and then the operational flow returns to the step 30*g* to execute steps similar to the above so that a stem and a flag will be added to the black head 46 when time t3 comes. As a result a sixteenth note is displayed in a step 30*r* as shown in FIG. 12.

Assuming that an eighth note sound of pitch name B is inputted at time t3 and t4, and subsequently a sixteenth note sound of pitch name G is inputted at time t5, the steps 30*b* to 30*f* are executed at time t3 so that the sound of pitch name B is analyzed and a corresponding black head of a note is displayed. Then at time t4, the pitch of the sound of the pitch name B is again analyzed in the steps 30*h* to 30*j*, and the sound is determined as a continuous sound in the step 30*k*. As a result, the determination in the step 30*k* becomes YES so that a step 301 is executed in which the count is increased by one to be 2. After this, it is determined whether the count is of an even number or not in a following step 30*m*. Since the count is 2, a step 30*n* is executed to produce pattern data by using the count and the result of sound pitch analysis. In this case, an eighth note of FIG. 10B corresponding to count 2 is produced. Therefore, an eighth note indicating pitch name B is displayed in a step 300 as indicated at a reference 47 in FIG. 12. Since the head of the eighth note has been displayed, it is seen on the screen of the CRT 14 that a stem and a flag are respectively added to the head to complete the eighth note.

When a next sound, i.e. a sixteenth note sound of pitch name G, is analyzed in the steps 30*h* to 30*j* at time t5, then it is determined that the input sound is noncontinuous in the step 30*k*, and the step 30*p* is executed to check if the count is of an even number. At this time as the count is of an even number, a step 30*s* is executed for clearing the count. Then steps 30*t* and 30*u* are executed in sequence for displaying a head of a sixteenth note of pitch name G at a position next to the previous note as indicated by a reference 48 in FIG. 12.

Figure 13:
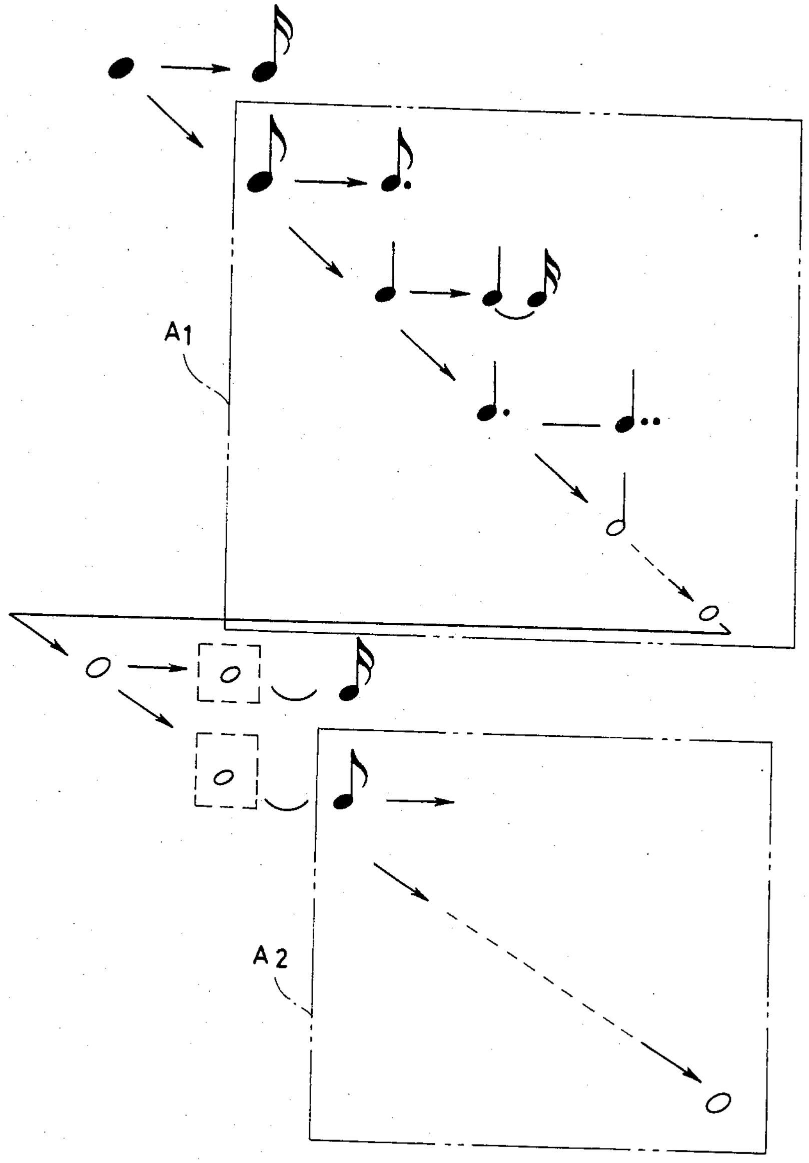
FIG. 13 is an explanatory diagram showing how an initially displayed musical note changes its pattern for indicating longer time value in the second embodiment device.

When a sound having time value of a dotted eighth note is inputted, a black head of a note indicating the sound pitch thereof is displayed in the step 30*f* at time t1, and then the count is increased by one to be 1 in the step 30*g*. As time goes to time t2, it is determined that the sound is a continuous sound in the step 30*k*, and then the count is increased to 2 in the step 30*l*. It is determined that the count is of an even number in the step 30*m*, and then the eighth note is displayed by the execution of the steps 30*n* and 30*o* (see FIG. 10C). As time t3 comes, the sound is again determined as a continuous sound in the step 30*k*, and therefore, the count is increased to 3 in the step 30*l*. The determination in the step 30*m* thus results in NO so that steps 30*n* and 30*o* are not executed at this time. Subsequently in time t4, it is determined that the sound is noncontinuous in the step 30*k*, and therefore, the step 30*p* is executed in which it is determined that the count is of an odd number. As a result, the steps 30*q* and 30*r* are executed in sequence so that a dotted eighth note of FIG. 10C is displayed. Therefore, it is seen on the screen of the CRT 14 as if a dot were added to the eighth note. Summarizing the display operation of the dotted eighth note, displayed note changes from only the black head (FIG. 10Q) to an eighth note (FIG. 10B) first and then to a dotted eighth note (FIG. 10C) as indicated in FIG. 13.

Similarly, in the case of displaying a half note, a black head of a note indicative of only the sound pitch is displayed in the step 30*f* first, and then a stem and a hook are respectively added to the black head in the steps 30*n* and 30*o* in accordance with the count determined by the step 30*l* such that the sort of the musical note changes as an eighth note → a quarter note → a dotted quarter note with a displayed pattern of the note being changed. Then finally, a half note of FIG. 10H is displayed by the exeuction of the steps 30*q* and 30*r* since the count is 8. In this way, the displayed note changes as time goes such that only a black head is first displayed and then a stem and a hook are added to the black head so that the note indicates longer time value as time passes, approaching the time value of the input sound.

On the other hand, when a sound having a time length longer than a whole note is inputted, the count, which reaches 16 at the end of a time period corresponding to a whole note, is then cleared once so that the count starts again from 0. FIG. 13 shows how the pattern of an initially displayed note changes for indicating longer time value in sequence. As indicated at a right bottom portion of an area A1 in FIG. 13, when a sound having a time length longer than a whole note is inputted, a pattern of FIG. 10R, showing a whole note with a tie, is displayed first and then another note to be coupled with the whole note by the tie will be displayed at the time when a subsequent sound or rest is received. An area A2 is the same as the area A1 so that a quarter note to be coupled with the whole note by the tie will be changed in the same manner as in the area A1.

Summarising the second embodiment of FIGS. 8A to 13, a black head of a note is first displayed in the step 30*f*, then a stem and a hook are added to the black head in the step 30*o* so that the sort of the displayed note changes in a direction that the time value represented by the note becomes longer so as to approach the actual time length of the input sound, and then the sort of the note is finally determined so that an appropriate note is displayed in the step 30*r*, while the pitch of a subsequent sound is indicated by a next black head in the step 30*u*.

In the above-described first and second embodiments, the sort of a musical note to be displayed is simply determined by measuring the time length of a continuous sound such that a predetermined period of time corresponds to an eighth note, and a period twice the predetermined period corresponds to a quarter note. Since time length represented by a note indicative of a predetermined time value defines tempo or playing speed of music, the above-mentioned predetermined period of time defines the tempo of music which is the objective of pitch and time value analysis. This means a standard tempo or playing speed is preset within the microcomputer 5 for determining the relationship between actual time length and the time value of each note. In other words a time value of a note of the same sort is fixed to a predetermined time length such that a quarter note represents 1/60 second. However, it is preferable that the relationship between the time value of notes and the time length of each sound can be changed so that music sheets obtained by the musical note display apparatus according to the present invention can be readily read, and that time value of musical notes is suitable for quick or slow tempo music.

Figure 14:
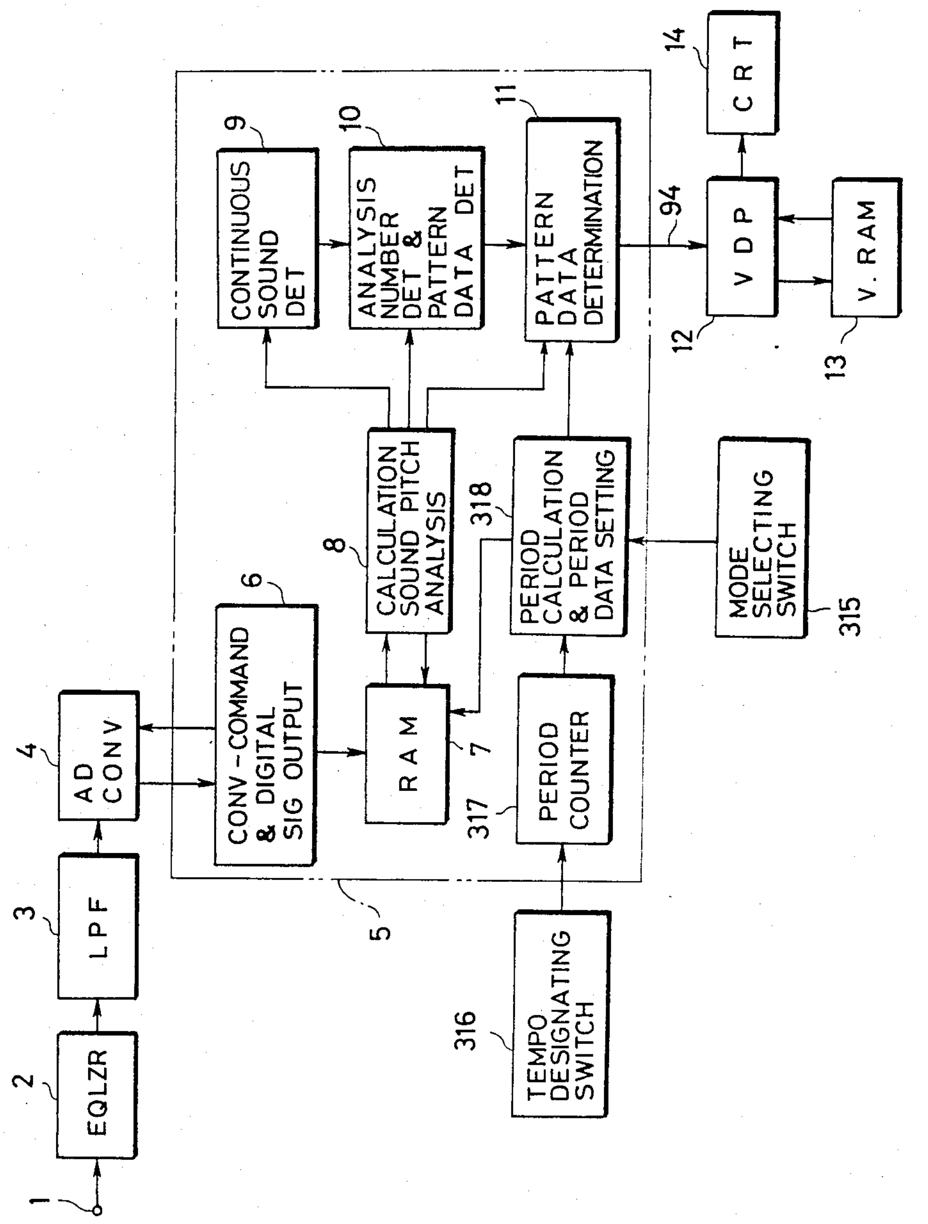
FIG. 14 is a schematic block diagram of a third embodiment of the musical note display device according to the present invention.

Hence, reference is now made to FIG. 14 showing a third embodiment of the present invention, which is capable of changing the standard tempo. A period data corresponding to the standard tempo, which may be expressed by ♩=60 is prestored in a waiting period data storing area of the RAM 7. This standard tempo data may be rewritten when necessary as will be described hereinlater.

A circuit arrangement of FIG. 14 comprises, in addition to circuits shown in FIG. 1A, a mode selecting switch 315 and a tempo designating switch 316. The control unit 5, which is actualized by a microcomputer in the same manner as in the previous embodiments, is shown to include portions which are not shown in FIG. 1A. In detail, the control unit 5 comprises, in addition to circuits shown in FIG. 1A, a period counter portion 317 and a period calculation and period setting portion 318 which may be actualized by the software of the microcomputer in the same manner as remaining circuits representing the functions of the microcomputer.

The mode selecting switch 315 is provided to select either a normal mode or a tempo-setting mode. More particularly, the mode selecting switch 315 is arranged to produce a high-level (logic "1") signal when the tempo-setting mode is selected and a low-level (logic "0") signal when the normal mode is selected, and the output signal from the mode selecting switch 315 is fed to the control unit 5. The tempo designating switch 316 may be a push-button switch of nonlock type so as to be manually depressed twice in sequence for setting a desired period with which the standard tempo is changed as will be described hereinafter.

Figure 15:
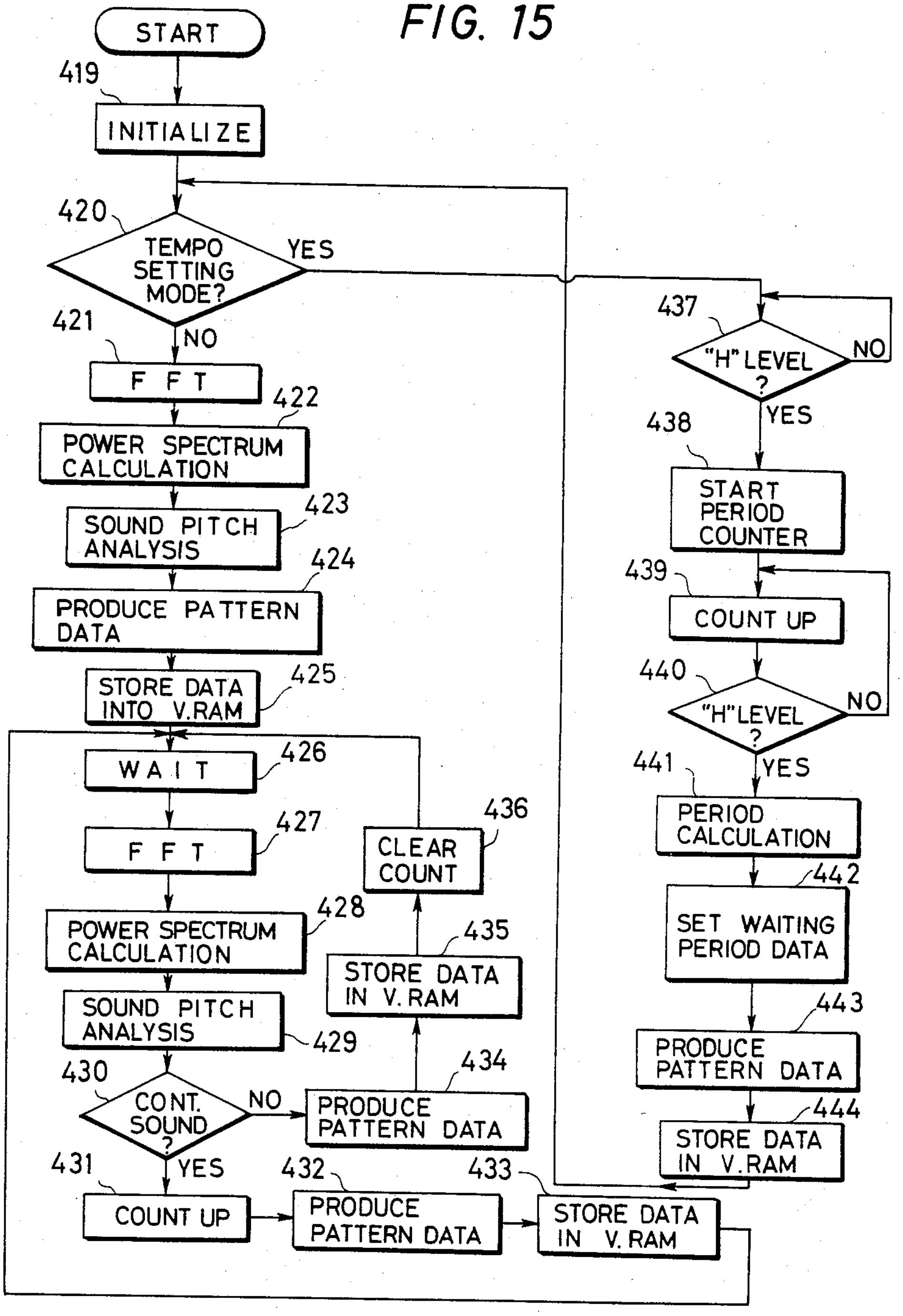
FIG. 15 is a flow chart showing the operation of the central processing unit used in the third embodiment of FIG. 14.

The operation of the third embodiment of FIG. 14 will be described with reference to a flow chart of FIG. 15 showing a main routine of the program for the CPU 80 of the microcomputer. Although no interrupt service routine is shown, the interrupt service routine of FIG. 8B for the second embodiment may be applied so that the main routine is periodically interrupted for effecting AD conversion. In the case that it is desired to display musical notes whose time value is of the standard tempo, the switches 315 and 316 are not manipulated. The state of the mode selecting switch 315 is detected in a step 420 by checking whether the output signal therefrom is either of high or low level. Then it is determined that the normal mode has been selected, and thus a step 421 is executed. Steps 421 to 425 are substantially the same as steps 30*b* to 30*f* of FIG. 8A so that a black head of a note indicative of the pitch of the input sound is displayed on the displayed staff in the same manner as in the second embodiment. A time length required for executing the steps 421 to 423 is set in advance to a time period corresponding to the time value of an eighth note shown in FIG. 16A. Therefore, sound pitch at time time t1 of FIG. 17 is analyzed by the execution of these three steps 421 to 423.

Figure 17:
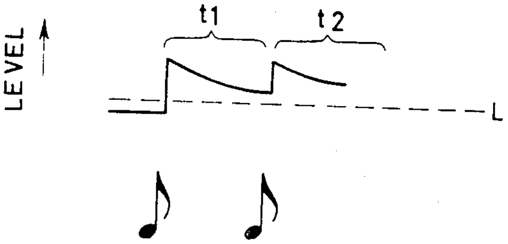
FIG. 17 is an explanatory diagram showing level of an input audio signal whose pitch and time length are to be indicated by way of the musical note patterns of FIGS. 16A through 16I.
Figure 19:
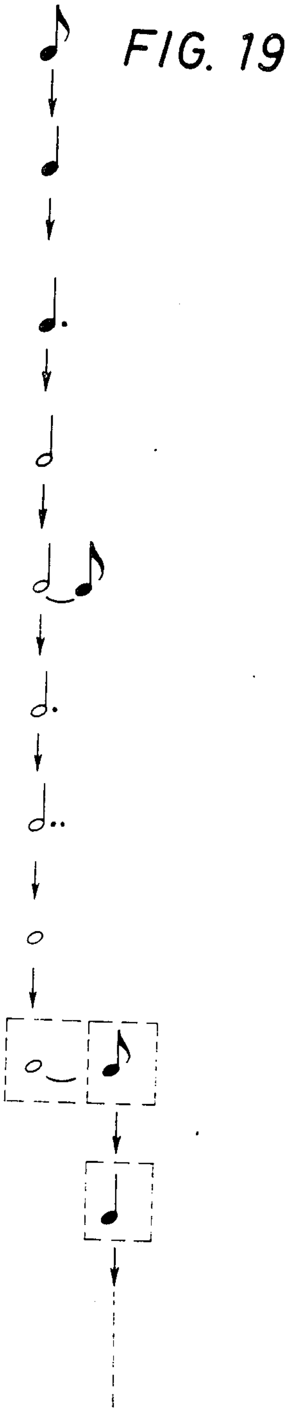
FIG. 19 is an explanatory diagram showing how an initially displayed musical note changes its pattern for indicating longer time value in the third embodiment device.

Assuming that sounds, each of which attentuates as time passes like sound from the piano, are inputted such that eighth note sounds of pitch name G and pitch name A are alternately inputted as shown in FIG. 18, sound pitch analysis is effected by the execution of the steps 421 to 423 at time t1 of FIG. 17, and then corresponding pattern data is generated in a step 424. The pattern data is selected from the ROM 82 by using the count of the counter, where one of various patterns is selected in accordance with the count. The relationship between the count and the various note patterns is shown in FIGS. 16A to 16I. In the above case, since the count is zero, and since the sound pitch is G, pattern data of an eighth note indicative of sound pitch G is read out and fed via the VDP 12 to the V.RAM 13. As a result, these alternate sounds are displayed as indicated at references 40*a* and 40*b* in FIG. 18.

After the note pattern 40*a* is displayed on the staff, a step 426 is executed for waiting for a period of time equal to a standard waiting period determined by the standard tempo data, expressed by ♩=60. In other words, a next step 427 for FFT operation is not performed until this period of time is elapsed. When this waiting period of time has elapsed, the pitch of the sound of pitch name A is analyzed in steps 427 to 429 at time t2 of FIG. 17. Then in a following step 430, it is determined whether the sound at time t2 is continuous from time t1 in the same manner as in the previous embodiments.

In the above example, the sound at time 2 is determined as noncontinuous, and therefore, steps 434 and 435 are executed to display the eighth note sound of pitch name A as indicated by the reference **40*b* in FIG. 18. A step 436 for clearing the count is executed for resetting the count to 0. At this time, since the count is 0, the count does not change. Then the step 436 is again executed for waiting before the execution of the steps 427 to 429** at time t3 of sound pitch analysis.

When a quarter note sound of pitch name C is inputted as indicated at the reference **40*c* in FIG. 18, since the count is 0, a note pattern of an eighth note of FIG. 16A representing pitch name C is displayed by the execution of the step 425. Then it is determined that the sound is continuous in the step 430, and therefore the count is increased by one to be 1 in a step 431. Then steps 432 and 433 are executed so that the eighth note is replaced with a quarter note (see FIG. 16B). Then the pitch of a sound subsequent to the quarter note sound of pitch name C is analyzed by steps 427 to 429, and when it is determined that the sound is noncontinuous in the step 430, the pitch of the sound subsequent to the sound of pitch name C is displayed at a position next to the previous note by way of an eighth note by the execution of the steps 434 and 435. Then the count is cleared in the step 436 to proceed to the step 426 for waiting before pitch analysis of a next sound is effected by the steps 427 to 429**.

In this way, sound pitch to be displayed by the execution of the steps 425 and 435 is temporarily displayed by way of an eighth note, and then the shape of the eighth note is changed by the execution of the step 433 so that the eighth note is changed to a longer note each time the step 433 is executed. Since the sort of a note to be displayed in the step 433 is determined in accordance with the count, one of the nine different notes of FIGS. 16A to 16I is finally displayed. The way of changing the time value from the eighth note of FIG. 16A to the whole note with a tie of FIG. 16I is substantially the same as that described in connection with the second embodiment.

Although the above-operation is effected when the standard tempo expressed by ♩=60 has been set, when it is intended to change the tempo from the standard tempo, the mode selecting switch 315 is manipulated to change the mode from the normal mode to the tempo-setting mode. When this mode selecting switch 315 is manipulated, an external interruption is arranged to occur so that the execution of steps of the main routine is interrupted and the operational flow is reset to the first step 419 for initializing. Therefore, when the tempo-setting mode is selected, the step 420 is executed to see whether the tempo-setting mode has been selected. Then the determination in the step 420 results in YES so that a step 437 is executed for detecting the presence of a high level signal from the period designating switch 316. If the presence is not detected, the step 437 is repeatedly executed. Assuming that the tempo designating switch 316 has been first depressed by the user, then a step 438 is executed for starting measuring a period of time manually designated. This time period is defined by a time length between instants of two consecutive manipulations of the tempo designating switch 316. In the arrangement of FIG. 14, the period counter portion 317 is caused to start counting a variable. In an actual circuit configuration, however, counting may be actualized by the software as shown by steps 438 to 440. Namely, after the execution of the step 438, the step 439 takes place to count up by one, and then it is determined whether the signal from the tempo designating switch 316 is again high or not. If the signal is of low level, the step 439 is repeatedly executed to continuously count up so that the variable increases one by one. When a high level signal from the tempo designating switch 316 is detected, the determination in the step 440 becomes NO, and then the period defined by the time length between instants of two consecutive manipualtions of the period designating switch 316 is calculated by using a newest count in a step 441. Then a new waiting period data is set in accordance with the designated period in a step 442. The steps 441 and 442 are executed by the period calculating and period setting portion 318 of the control unit 5 shown in FIG. 14. Suppose that the designated period represents a tempo expressed by ♩=30, waiting period data corresponding thereto is written in the waiting period data area of the RAM 7.

Figure 20A:
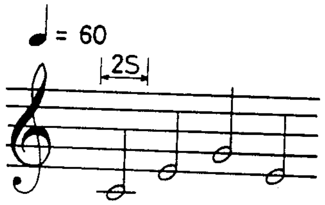
FIGS. 20A and 20B are diagrams showing the change in time value due to the change in tempo.
Figure 20B:
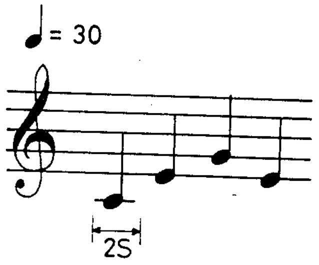

In accordance with this newly set waiting period data, pattern data of a tempo symbol is produced in a step 443, and then the tempo symbol is displayed on the CRT in a following step 444. In the above example, numerals "60" at the right of the equal sign is changed to "30". Therefore, the tempo symbol is displayed as ♩=30. After the execution of the step 444, the operational flow returns to the step 420. When returning from the step 444 to the step 420, data indicative of the tempo-setting mode is cancelled. Therefore, the determination in the step 420 becomes NO unless the mode selecting switch 315 is manipulated again. Then the pitch of input sounds is analyzed by the following steps in a manner similar to the above. When a sound of pitch name C is inputted continuously as shown in FIG. 20A, where the length of the sound is 2 seconds, this sound is first displayed by way of an eighth note in the step 425, and transition to the next step 427 is delayed in the step 426 for a time period defined by the waiting period data corresponding to ♩=30. Thus when the time period has elapsed, the step 427 is executed so that this sound of pitch name C is again analyzed by the steps 427 to 429. This sound is determined as a continuous sound in the step 430, and then the count is increased by one to be 1 in the step 431. The steps 432 and 433 are executed in sequence so that a quarter note indicative of pitch name C is displayed in place of the previously displayed eighth note as shown in FIG. 20B. In this way following half notes of pitch name E, G and E of FIG. 20A are respectively changed in sequence to quarter notes as shown in FIG. 20B.

From the above it will be understood that musical notes, which would have been displayed as shown in FIG. 20A with each sound being analyzed four times per two seconds, are now displayed as shown in FIG. 20B because each sound is analyzed only two times per two seconds in response to the change in the tempo. This means that the tempo change results in change in the number of times of pitch analysis per unit time. In the above example, the number of times of pitch analysis has been changed from four to two where a period of time required for effecting each pitch analysis is fixed to an eighth note time length. In this way, the number of times of pitch analysis can be changed so that time value of a musical note can be reduced.

On the contrary, in the case that the time value of musical notes determined by using the standard tempo is too small, the standard tempo may be changed to another tempo which may be expressd by, for instance ♩=240. Especially, when analyzing music having a relatively fast tempo, such change is useful. In order to change the standard tempo in this way, the mode selecting switch 315 and the tempo designating switch 316 are manipulated for designating a relatively small waiting period. With this operation, quick tempo music sounds played at a speed of thirty-second note, i.e. 8 times per second, can be displayed by eighth notes appearing eight times per second with the number of times of sound pitch analysis being reduced such that pitch analysis is peformed eight times per second.

From the above it will be understood that according to the third embodiment of FIGS. 14 to 20, it is possible to select a desired playing tempo which can be displayed on the CRT so that the player of a musical instrument or the user of the apparatus according to the present invention can see not only the displayed musical notes on the staff but also a designated speed or tempo. Futhermore, according to the third embodiment it is possible to either quicken or slow down the tempo by manipulating the switches 315 and 316 so that each musical note corresponds to desired time value. This is especially useful when analyzing relatively slow or quick tempo music, and moreover it is possible to display musical notes with time values which can be readily read.

Figure 21:
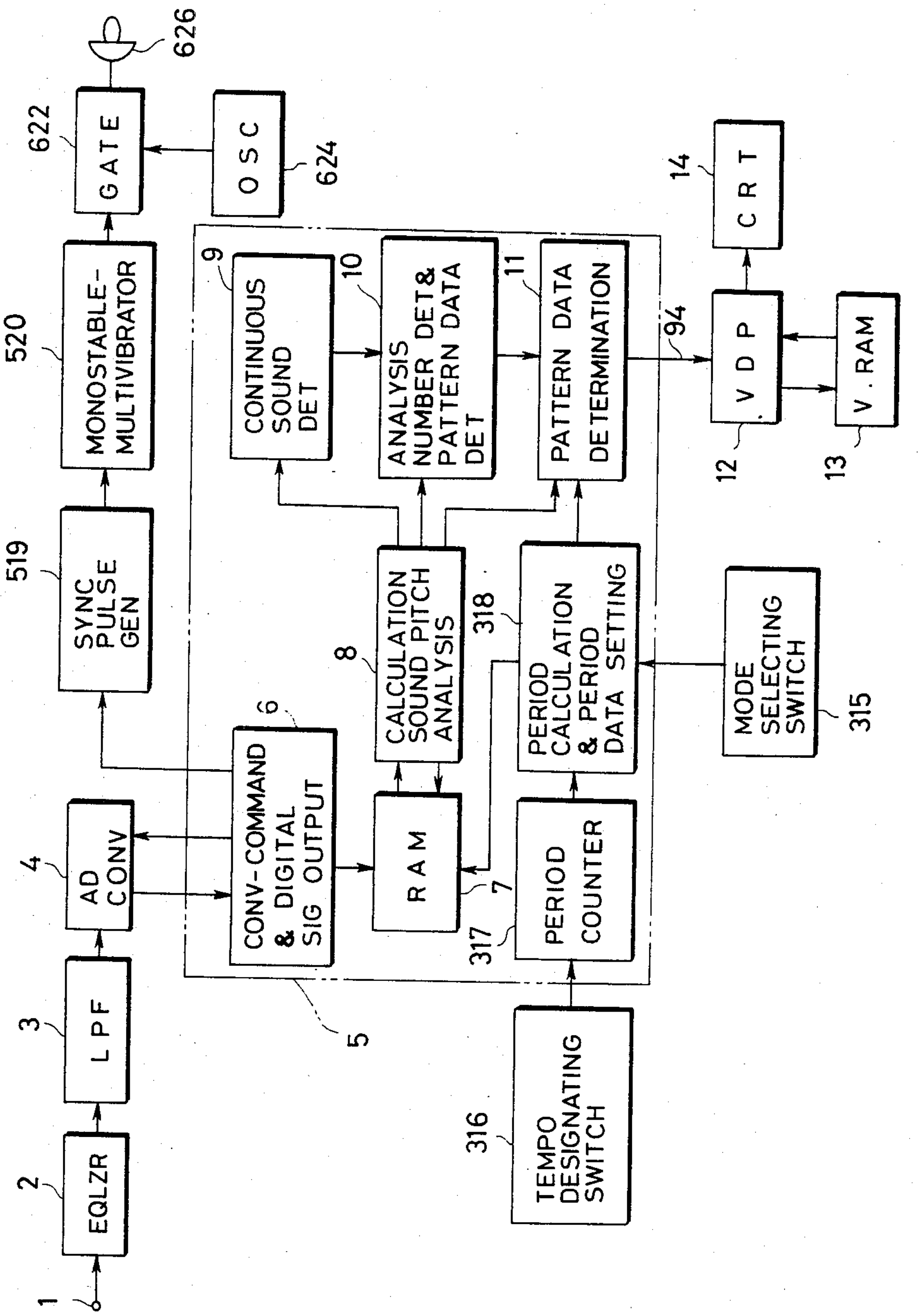
FIG. 21 is a schematic block diagram of a fourth embodiment of the musical note display device according to the present invention.

Reference is now made to FIG. 21 showing a fourth embodiment of the present invention. The fourth embodiment is a modification of the above-described third embodiment. More specifically, the fourth embodiment apparatus is capable of emitting rhythm sounds or emitting flashing light in accordance with a desired tempo. A circuit arrangement of FIG. 21 comprises, in addition to the arrangement of the third embodiment of FIG. 14, a synchronous pulse generator 519, a monostable multivibrator 520, an oscillator 624 used as a sound source, and a gate circuit 622.

Figure 22A:
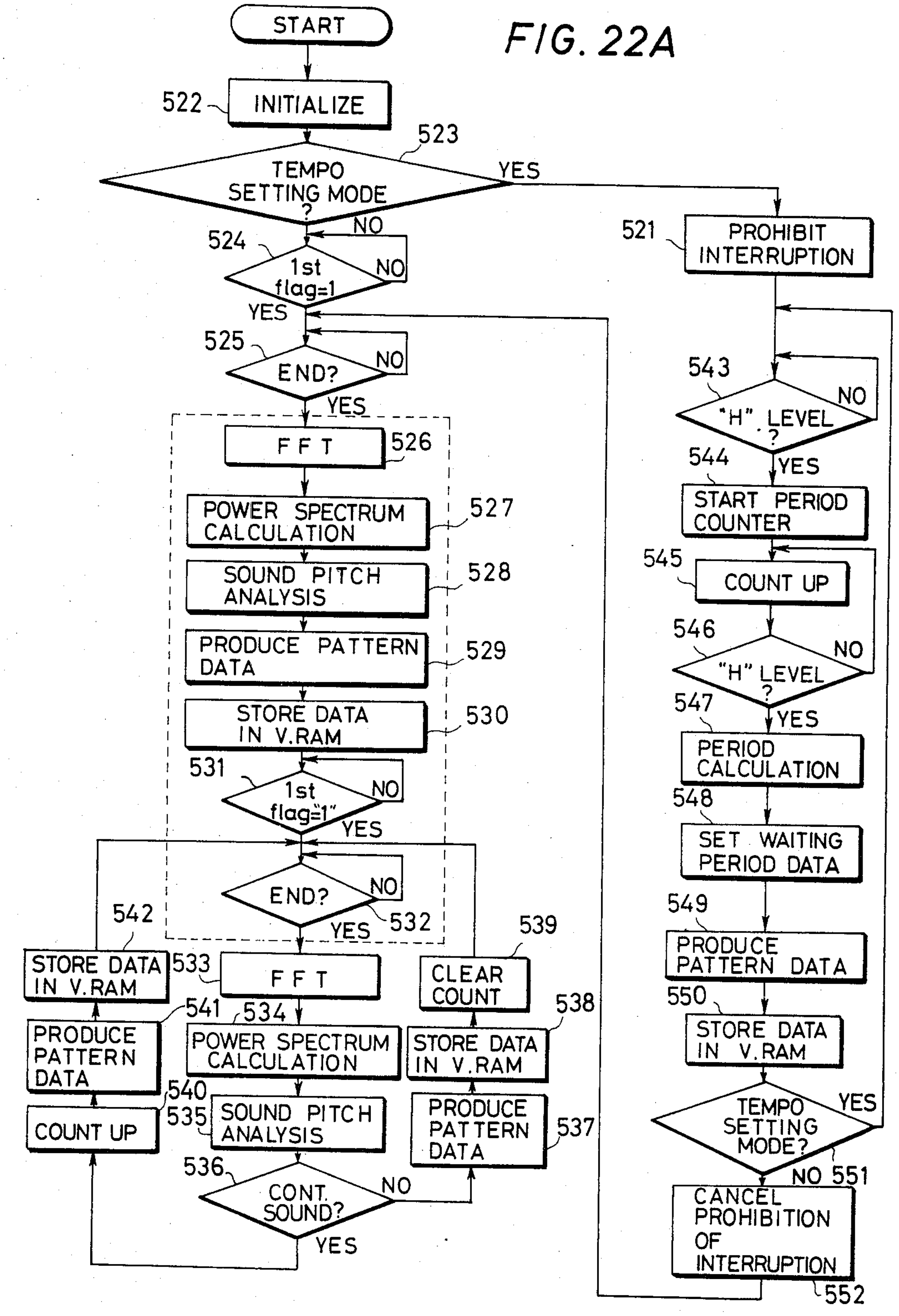
FIGS. 22A and 22B are flow charts showing the operation of the central processing unit used in the fourth embodiment of FIG. 21.
Figure 22B:
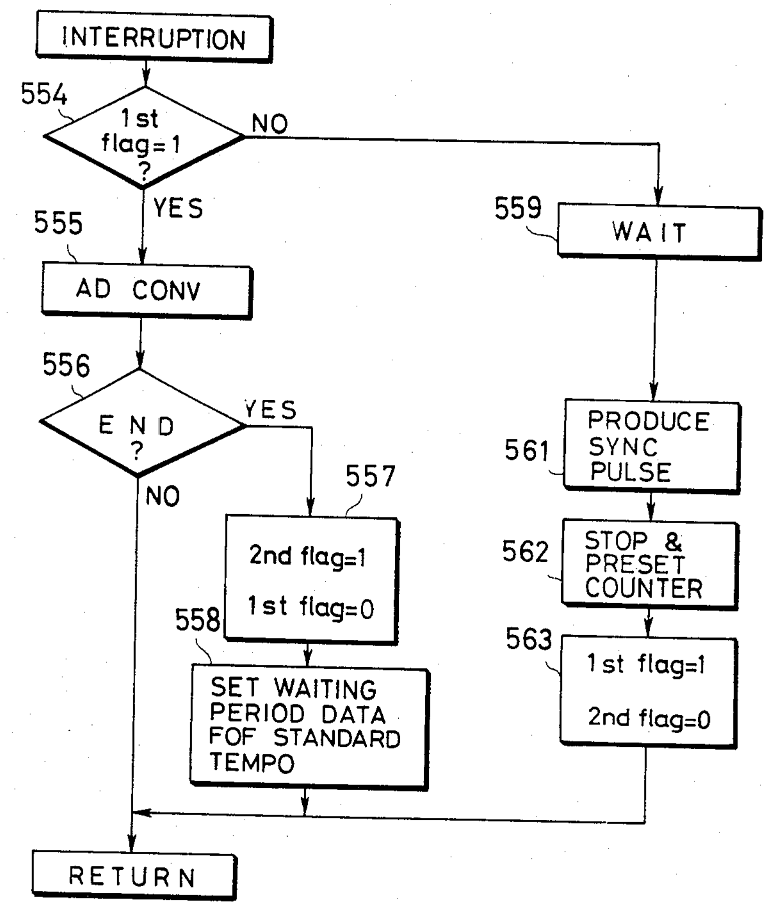

FIGS. 22A and 22B respectively show a main routine and an interrupt service routine for the operation of the microcomputer used as the control unit 5 of FIG. 21. The interrupt service routine of FIG. 22B is arranged to be executed at an interval equal to the sampling period in the same manner as in the previous embodiments. In the third embodiment, although waiting is effected in the step 416 of the main routine so as to set a desired tempo, such waiting is effected in the interrupt service routine of FIG. 22B in the fourth embodiment. In a first step 522 of the main routine of FIG. 22A, system initialization is effected. With this system initialization, waiting period data, which is stored in the RAM 7, is set to a value indicating a standard tempo expressed by ♩=60. A following step 524 corresponds to the step 420 in FIG. 15, and it is checked whether the mode selecting switch 315 has been set to the tempo-setting mode or normal mode. If the tempo-setting mode has been selected, a step 521 is executed for prohibiting the occurrence of program interruption. As a result, interruption-prohibition condition is established so that the interrupt service routine of FIG. 22B is not executed during execution of a series of steps provided for manually designating a desired tempo. In detail, steps 543 to 550, which are substantially the same as the steps 437 to 444 of FIG. 15, are executed so that the user can set a desired tempo by manipulating the tempo designating switch 316. After the execution of the step 550, a step 551 similar to the step 523 is executed so that the series of steps 543 to 550 just executed are repeatedly executed until the normal mode is selected. When it is determined that the normal mode is selected, namely, when the mode selecting switch 315 is changed over to the normal mode, a step 552 is executed for cancelling the interruption-prohibition condition.

When the interrupt service routine takes place, a step 554 is first executed to determine whether a first flag indicating the starting of AD conversion is set to logic "1" or not. If YES, a step 555 is executed to cause the AD converter 4 to start AD conversion. As a result, a sampling pulse is fed to the AD converter 4 and resultant AD converted digital data having a single word is stored into the RAM 7. Then it is checked whether AD conversion is ended or not in a step 556 by checking whether the number of AD converted data words has reached a predetermined number, such as 256. If AD conversion is not ended yet, the interrupt service routine is terminated. On the other hand, if AD conversion has been ended, a step 557 is executed to set a second flag indicating that AD conversion is terminated to logic "1", and to reset the first flag to logic "0". Then in a following step 558, initial setting for waiting period data is effected so that the waiting period data, which may be changed from the standard tempo, is reset to the standard tempo of ♩=60.

Figure 24:
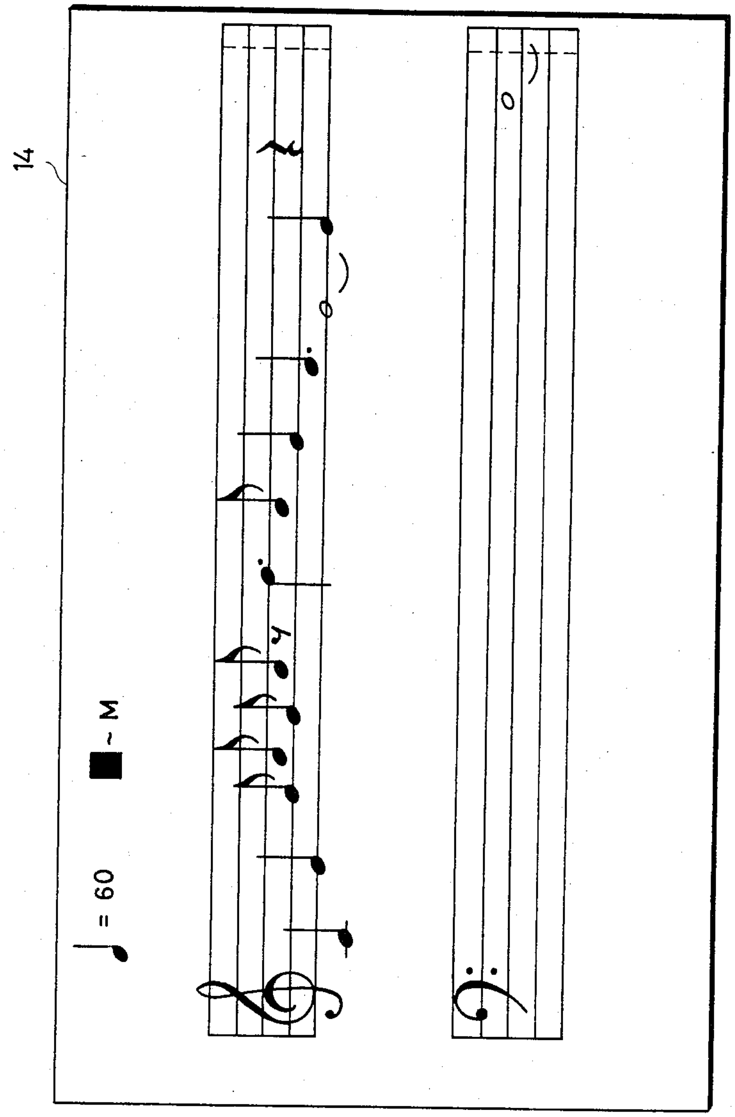
FIG. 24 is a diagram showing an example of a music sheet displayed on a screen of the display unit of FIG. 21.

After the completion of AD conversion, when the step 554 is executed on subsequent interruption, the determination therein results in NO so that a step 559 is executed in which waiting is effected. More particularly, transition to a next step 561 is retarded by a time length corresponding to the standard waiting period data which has been set in the step 558. When the waiting period has elapsed, the step 561 is executed to produce a synchronous pulse signal. This pulse signal is produced by the synchronous pulse generator 519 of FIG. 21, and is applied to the monostable multivibrator 520 so that a pulse of a predetermined width is fed to the gate circuit 622. As a result, an audio signal from the oscillator 624 is fed via the gate circuit 622 to the earphone 626 for a time length defined by the width of the pulse from the monostable multivibrator 520. Thus, the earphone 621 produces audible sounds intermittently in accordance with the pulses from the synchronous pulse generator 519 as rhythm sounds. Furthermore, the synchronous pulse signal is used to produce a marker-flashing control signal which is fed via the VDP 12 to the V.RAM 13. As a result, a marker M displayed on the screen of the CRT 14 flashes at an interval equal to the rhythm sounds as seen in FIG. 24 which shows displayed note patterns on the screen of the CRT 14 used in the fourth embodiment. The marker M is displayed next to the tempo number indicating a designated or standard tempo. The emission of the rhythm sounds and the indication of the marker are effected intermittently such that it corresponds to the time value of an eighth note. For instance, when the standard tempo of ♩=60 is set, the rhythm sound emission and marker flashing are both effected twice per one second.

Figure 23A:
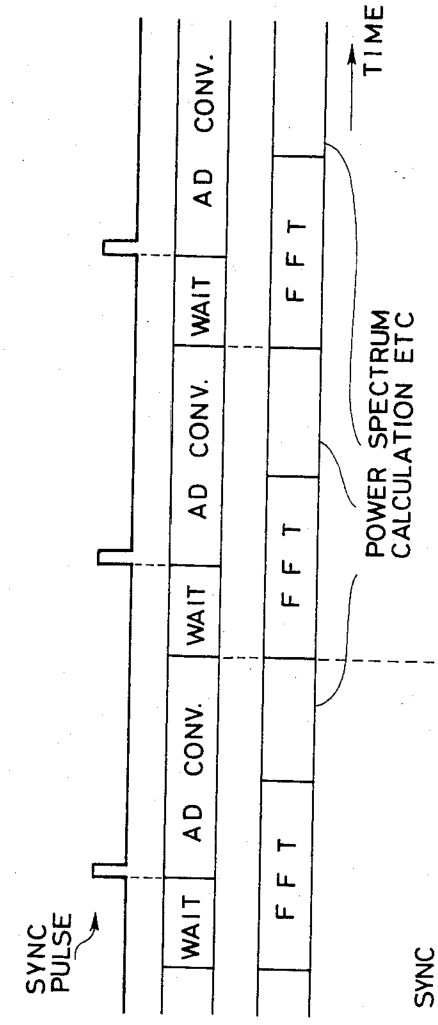
FIGS. 23A and 23B are time charts showing operations by the microcomputer used in the fourth embodiment device.
Figure 23B:
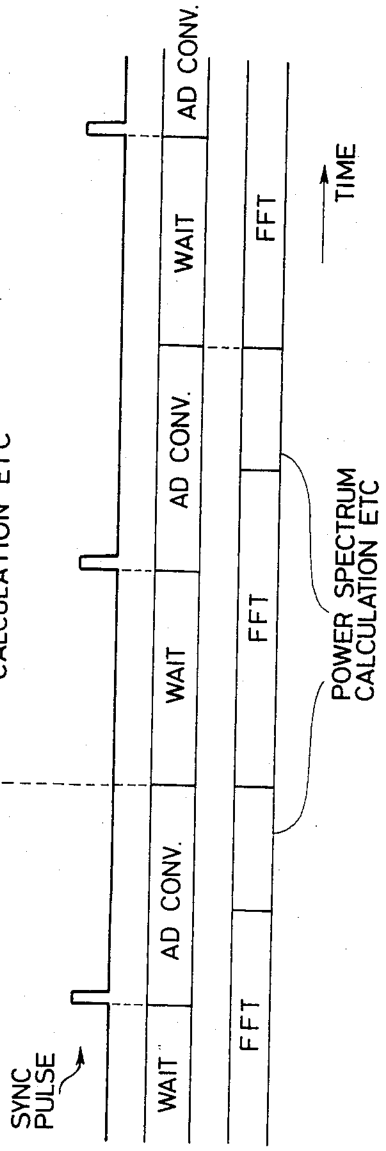

This point will be clearly seen in FIGS. 23A and 23B which are timing charts showing the operations by the microcomputer. More specifically, FIG. 23B shows operation timing where the tempo is set to a relatively slow value compared to the opearation timing of FIG. 23A. As will be understood from the interrupt service routine of FIG. 22B and the timing charts of FIGS. 23A and 23B, waiting is effected in accordance with a designated tempo after each AD conversion period in which 256 AD converted digital words are obtained.

After the execution of the step 561, a step 562 is executed for initializing AD conversion operation. Then in a following step 563, the first flag is set to logic "1", and the second flag is reset to logic "0", and then the interrupt service routine is terminated.

Turning back to FIG. 22A, when it is determined that the tempo-setting mode is not selected in the step 523, a step 524 is executed to check whether the first flag is set to logic "1" or not. When the first flag is set to logic "0", this step 524 is repeatedly executed until the first flag turns to logic "1" for prohibiting the execution of the following series of steps used for pitch analysis until all the 256 data words necessary for FFT operation are prepared. This is also checked by a following step 525 in which it is determined whether the 256 data words have been obtained. When it is determined that the AD conversion has ended in the step 256, steps 526 to 530 are executed for determining the sound pitch in the same manner as in previous embodiments. Then following steps 531 and 532, which are substantially the same as the steps 524 and 535, are executed to prohibit sound pitch analysis until another set of 256 AD converted digital data words are obtained. When all the digital data words of the subsequent set have been obtained, steps 533 to 536, which are substantially the same as the steps 426 to 430 of FIG. 15, are executed to obtain pitch and level data from the subsequent set of the digital data words and to determine whether the input sound is of a continuous sound. Steps 537 to 539 and 540 to 542 respectively following the step 536 are substantially the same as corresponding steps 434 to 436 and steps 431 to 433 of FIG. 15 so that the pattern of a displayed note is changed such that the time value represented by the note pattern increases each time it is detected as a continuous sound in the step 536, and a subsequent note is displayed when it is determined as a noncontinuous sound.

From the above it will be understood that the fourth embodiment is capable of emitting rhythem sounds and indicating the tempo maker M in accordance with the period of AD conversion, while FFT operation is started immediately after the completion of AD conversion. Therefore, a musical instrument player or a singer can accurately play his musical instrument or sing by watching the flashing marker M or listening to the rhythm sounds, while sound pitch analysis is effected immediately after the completion of AD conversion so that substantially real time display is possible.

From the foregoing description it will be understood that the device according to present invention may be effectively used when simply playing a musical instrument or composing music. The above-described embodiments are just examples of the present invention, and therefore, it will be apparent for those skilled in the art that many modifications and variations may be made without departing from the spirit of the present invention.

What is claimed is:

1. A musical note display device for displaying musical notes each indicative of pitch and time length of each sound of an input audio signal on a displayed staff, comprising:

(a) analog-to-digital converting means for converting said input audio signal into digital data by using sampling pulses having a sampling frequency;

(b) computing means for effecting FFT operation by using said digital data, for executing power spectrum calculation by using a result of sid FFT operation, for determining a pitch of each sound by using spectrum data obtained by said power spectrum calculation, for determining a time value of each sound by measuring time length of each sound, and for determining a pattern to be displayed in accordance with the pitch and time value of each sound;

said computing means determining the pitch by obtaining a fundamental tone by obtaining a frequency component whose level is lowest within a predetermined level range from a highest level, and whose frequency is lower than a frequency at which the level is the highest, and, in case such a frequency component is not detected, determining the pitch by regarding the frequency component, whose level is the highest, as the fundamental tone;

said computing means determining the time value by measuring time length for which each sound is regarded as continuous, where each sound is regarded as continuous when frequency difference and level difference between two consecutive detections are both within predetermind ranges, and when the level of said sound is above a predetermined level; and (c) display means including a video display processor, a video RAM and a display unit, said video display processor being controlled by said computing means to store data indicative of said pattern into said video RAM, and said display unit being responsive to a video signal from said video display processor for indicating musical notes displayed at appropriate position on a display staff.

2. A musical note display device as claimed in claim 1, wherein said computing means is arranged to execute said FFT operation, said power spectrum calculation and the pitch determination within a time period which is one-half a time length of a musical note having a shortest time value so that another set of FFT operation, power spectrum calculation and pitch determination is continuously effected immediately after a first set of these operations only when said input sound is determined as noncontinuous and the number of times of execution of said second set of operations is of an odd number.

3. A musical note display device as claimed in claim 1, wherein said computing means is arranged to display a musical note indicating only the sound pitch when the sound pitch has been determined, and to change the pattern of said musical note so that time value is indicated when said sound is continuous for a predetermined period of time.

4. A musical note display device as claimed in claim 3, wherein said computing means is arranged to change the pattern of said musical note such that a musical note indicating a shortest time value is displayed first in place of said musical note indicating only the sound pitch and then a musical note indicating a longer time value is displayed in sequence in place of a previous musical note so that the time value indicated by a newest musical note increases as long as the sound is regarded as a continuous sound.

5. A musical note display device as claimed in claim 4, wherein said computing means is arranged to finally determine the pattern of said musical note when it is regarded that said input sound is regarded as noncontinuous so that the time value indicated by said musical note represents a time length for which said input sound has been continued with the frequency and level differences thereof being maintained within said predetermined ranges, and to display a next musical note indicating only the sound pitch thereof at a position next to said first-mentioned musical note in response to the change in pitch and/or level of said input sound.

6. A musical note display device as claimed in claim 1, wherein said computing means is arranged to wait given time length while executing one cycle of a program so that said determination of sound pitch is effected with a time delay.

7. A musical note display device as claimed in claim 6, further comprising means for manually changing said time length for selecting a desired tempo.

8. A musical note display device as claimed in claim 1, wherein said computing means is arranged to execute an interrupt service routine at an interval equal to a sampling period of analog-to-digital (AD) conversion for causing said AD converting means to start AD conversion.

9. A musical note display device as claimed in claim 8, wherein said computing means is arranged to wait a given time length while executing one cycle of said interrupt service routine after a predetermined number of AD converted data is obtained so that subsequent AD conversion is effected with a time delay.

10. A musical note display device as claimed in claim 9, further comprising means for manually changing said time length for selecting a desired tempo.

11. A musical note display device as claimed in claim 10, further comprising means responsive to said computing means for emitting rhythm sounds at an interval of said AD conversion.

12. A musical note display device as claimed in claim 11, wherein said means for emitting rhythm sounds comprises a synchronous pulse generator responsive to said computing means, a monostable multivibrator responsive to a pulse signal from said synchronous pulse generator for producing a pulse of a predetermined width, an oscillator for generating an output signal of an audio frequency, and a gate circuit responsive to said pulse from said monostable multivibrator for outputting said output signal from said oscillator.

13. A musical note display device as claimed in claim 10, further comprising means responsive to said computing means for visually indicating a marker which flashes at an interval of said AD conversion.

14. A musical note display device as claimed in claim 13, wherein said marker is a pattern intermittently displayed on said display unit.

15. A musical note display device as claimed in claim 10, wherein said computing means is arranged to produce data indicative of said tempo in terms of a number so that said tempo is displayed on said display unit.

16. A musical note display device as claimed in claim 1, further comprising a graphic equalizer responsive to said input audio signal for changing frequency response prior to analog-to-digital conversion.

17. A musical note display device as claimed in claim 1, further comprising a low pass filter for limiting frequency range of said input audio signal so that a frequency limited signal is fed to said analog-to-digital converting means.

18. A method of detecting pitch and time length of a sound of an input audio signal, comprising the steps of:

(a) converting said input audio signal into digital data;

(b) effecting an FFT operation by using said digital data;

(c) executing a power spectrum calculation by using a result of said FFT operation;

(d) obtaining a fundamental tone to determine the pitch of of said sound of said input audio signal by using spectrum data obtained by said power spectrum calculation, the step of obtaining said fundamental tone including the steps of:

obtaining a frequency value of a frequency component whose level is lowest within a predetermined level range from a highest level and whose frequency is lower than a frequency at which the level is highest; and obtaining a frequency value at which the level is highest in case no frequency component is detected within said predetermined level range in the above step;

(e) repeating said steps (a) to (d) again so that two frequency data of said fundamental tone, and two level data are obtained for representing the results of two consecutive detections;

(f) determining time length of said sound by using said result of two consecutive detections, the step of determining time length including the steps of:

detecting whether a difference between two frequency data of said results of two consecutive detections is or is not within a predetermined frequency range;

detecting whether a difference between two level data of said results to said two consecutive detections is or is not within a predetermined level range;

detecting whether the level of the latter data of said results of said two consecutive detections is or is not above a predetermined value;

regarding said sound as a continuous sound only when all determinations is said three steps of time length determination are affirmative; and regarding said sound as a noncontinuous sound if one or more determinations in said three steps is negative.

19. A method as claimed in claim 18, further comprising a step of displaying musical notes in accordance with the pitch and time length of each sound, said step of displaying musical notes comprising the steps of:

(a) selecting a musical note pattern data from a memory in accordance with the pitch and time length of said sound when the time length is finally determined; and (b) sending said note pattern data via a video display processor to a video RAM so that said note pattern is displayed on a display unit when a subsequent sound is detected.

20. A method as claimed in claim 18, further comprising a step of displaying musical notes in accordance with the pitch and time length of each sound, said step of displaying musical notes comprising the steps of:

(a) selecting musical note pattern data from a memory in accordance with the pitch of said sound, where said note pattern is indicative of only the sound pitch;

(b) sending said note pattern data via a video display processor to a video RAM so that said note pattern is displayed on a display unit;

(c) selecting another musical note pattern indicative of both sound pitch and time value when said sound is detected as a continuous sound;

(d) sending said note pattern data obtained in said step (c) via said video display processor to said video RAM so that said note pattern indicative of both sound pitch and time value is displayed on said display unit in place of said note pattern indicative of only sound pitch;

(e) repeating said steps (b) and (c) as long as said sound is detected as a continuous sound so that said time value becomes longer;

(f) selecting musical note pattern data from said memory in accordance with the pitch of a subsequently determined sound, where said note pattern is indicative of only the sound pitch of said subsequent sound; and (g) repeating the preceeding steps so that musical notes are displayed in sequence on said display unit.

* * * * *